US010596518B2

(12) United States Patent
Feyen et al.

(10) Patent No.: US 10,596,518 B2
(45) Date of Patent: Mar. 24, 2020

(54) BIMETAL-EXCHANGED ZEOLITE BETA FROM ORGANOTEMPLATE-FREE SYNTHESIS AND USE THEREOF IN THE SELECTIVE CATALYTIC REDUCTION OF $NO_x$

(71) Applicants: BASF SE, Ludwigshafen (DE); TOKYO INSTITUTE OF TECHNOLOGY, Meguro-ku (JP)

(72) Inventors: Mathias Feyen, Laudenbach (DE); Stefan Maurer, Shanghai Pudong (CN); Ulrich Mueller, Neustadt (DE); Xinhe Bao, Dalian (CN); Weiping Zhang, Dalian North Gate Dut (CN); Dirk De Vos, Holsbeek (BE); Hermann Gies, Sprockhoevel (DE); Feng-Shou Xiao, Changchun (CN); Toshiyuki Yokoi, Meguro-ku (JP); Bilge Yilmaz, New York, NY (US)

(73) Assignees: BASF SE, Ludwigshafen (DE); TOKYO INSTITUTE OF TECHNOLOGY, Meguro-ku (JP)

( * ) Notice: Subject to any disclaimer, the term of this patent is extended or adjusted under 35 U.S.C. 154(b) by 0 days.

(21) Appl. No.: 15/109,601

(22) PCT Filed: Dec. 30, 2014

(86) PCT No.: PCT/IB2014/067413
§ 371 (c)(1),
(2) Date: Jul. 1, 2016

(87) PCT Pub. No.: WO2015/101930
PCT Pub. Date: Jul. 9, 2015

(65) Prior Publication Data
US 2016/0325228 A1 Nov. 10, 2016

(30) Foreign Application Priority Data
Jan. 3, 2014 (CN) .................. PCT/CN2014/070059

(51) Int. Cl.
*B01D 53/94* (2006.01)
*C01B 39/46* (2006.01)
*B01J 37/30* (2006.01)
*C01B 39/02* (2006.01)
*B01J 29/76* (2006.01)
*B01J 37/04* (2006.01)
*B01J 37/02* (2006.01)

(52) U.S. Cl.
CPC ...... *B01D 53/9418* (2013.01); *B01J 29/7615* (2013.01); *B01J 37/04* (2013.01); *B01J 37/30* (2013.01); *C01B 39/026* (2013.01); *C01B 39/46* (2013.01); *B01D 2255/20738* (2013.01); *B01D 2255/20761* (2013.01); *B01D 2255/502* (2013.01); *B01J 37/0203* (2013.01); *B01J 2229/183* (2013.01); *B01J 2229/186* (2013.01); *B01J 2229/34* (2013.01)

(58) Field of Classification Search
None
See application file for complete search history.

(56) References Cited

U.S. PATENT DOCUMENTS

| 3,308,069 A | 3/1967 | Wadlinger et al. |
| 4,554,145 A | 11/1985 | Rubin |
| 4,642,226 A | 2/1987 | Calvert et al. |
| 5,139,759 A | 8/1992 | Cannan et al. |

(Continued)

FOREIGN PATENT DOCUMENTS

| JP | 2011-116627 A | 6/2011 |
| WO | 2010/146156 A1 | 12/2010 |
| WO | 2013/118063 A1 | 8/2013 |

OTHER PUBLICATIONS

Xie, et al. "organotemplate free and fast route for syntehsizing beta zeolite". Chemistry of Materials. vol. 30, No. 14 (2008).*
International Search Report dated Jun. 1, 2015 in PCT/IB2014/067413 Filed Dec. 30, 2014.
Bin Xie, et al., "Organotemplate-Free and Fast Route for Synthesizing Beta Zeolite" Chemistry of Materials, vol. 20, No. 14, Jul. 22, 2008, pp. 4533-4535.
Gerardo Majano, et al., "Al-Rich Zeolite Beta by Seeding in the Absence of Organic Template" Chemistry of Materials, vol. 21, No. 18, 2009, pp. 4184-4191.

(Continued)

*Primary Examiner* — Sheng H Davis
(74) *Attorney, Agent, or Firm* — Oblon, McClelland, Maier & Neustadt, L.L.P.

(57) ABSTRACT

The present invention relates to a process for the production of a zeolitic material having a BEA-type framework structure comprising $YO_2$ and $X_2O_3$, wherein said process comprises the steps of (1) preparing a mixture comprising one or more sources for $YO_2$ and one or more sources for $X_2O_3$; (2) crystallizing the mixture obtained in step (1); (3) subjecting the zeolitic material having a BEA-type framework structure obtained in step (2) to an ion-exchange procedure with Cu; and (4) subjecting the Cu ion-exchanged zeolitic material obtained in step (3) to an ion-exchange procedure with Fe; wherein Y is a tetravalent element, and X is a trivalent element, wherein the mixture provided in step (1) and crystallized in step (2) further comprises seed crystals comprising one or more zeolitic materials having a BEA-type framework structure, and wherein the mixture provided in step (1) and crystallized in step (2) does not contain an organotemplate as a structure-directing agent, as well as to the zeolitic material having a BEA framework structure per se, and to its use, in particular in a method for the treatment of $NO_x$ by selective catalytic reduction (SCR).

23 Claims, 7 Drawing Sheets

(56) References Cited

U.S. PATENT DOCUMENTS

| | | | | |
|---|---|---|---|---|
| 5,676,912 | A | * | 10/1997 | Sharma ................ B01D 53/945 423/213.2 |
| 5,695,728 | A | * | 12/1997 | Miura ................ B01D 53/9418 423/239.2 |
| 8,282,908 | B2 | * | 10/2012 | Itabashi ................ C01B 39/46 423/709 |
| 8,865,121 | B2 | | 10/2014 | Xiao et al. |
| 9,011,815 | B2 | | 4/2015 | Xiao et al. |
| 2005/0000357 | A1 | * | 1/2005 | Simpson ................ B01D 53/02 95/134 |
| 2010/0092362 | A1 | * | 4/2010 | Li ................ B01D 53/9418 423/239.2 |
| 2010/0322847 | A1 | * | 12/2010 | Xiao ................ B01J 29/7007 423/709 |
| 2011/0056187 | A1 | * | 3/2011 | Seyler ................ B01D 53/9418 60/274 |
| 2011/0105303 | A1 | | 5/2011 | Takahashi et al. |
| 2011/0286914 | A1 | * | 11/2011 | Li ................ B01D 53/9418 423/700 |
| 2012/0039759 | A1 | * | 2/2012 | Narula ................ B01D 53/9418 422/179 |
| 2013/0123096 | A1 | | 5/2013 | Xiao et al. |
| 2013/0202524 | A1 | | 8/2013 | Maurer et al. |
| 2014/0161679 | A1 | * | 6/2014 | Chiffey ................ F01N 13/009 422/170 |

OTHER PUBLICATIONS

Pranit S. Metkar, et al., "Selective catalytic reduction of NOx on combined Fe- and Cu-zeolite monolithic catalysts: Sequential and dual layer configurations" Applied Catalysis B: Environmental, vol. 111-112, 2012, pp. 67-80.

Xiaofan Yang, et al., "Heterometal Incorporation in Metal-Exchanged Zeolites Enables Low-Temperature Catalytic Activity of NOx Reduction" The Journal of Physical Chemistry, vol. 116, 2012, pp. 23322-23331.

Extended European Search Report dated Jul. 31, 2017 in European Patent Application No. 14 877 063.9.

Notification of Reasons for Refusal dated Aug. 21, 2018 in Japanese Patent Application No. 2016-544525 with English translation.

Office Action dated May 2, 2019 in European Patent Application No. 14 877 063.9.

Ahmad Rahnama, et al., "Comparative study of copper precursors for synthesis of CuO nanoparticles by ultrasonic-assisted thermal decomposition method", J. Indian Chem. Soc. 90:271-277 (2013)—Abstract.

* cited by examiner

BIMETAL-EXCHANGED ZEOLITE BETA FROM ORGANOTEMPLATE-FREE SYNTHESIS AND USE THEREOF IN THE SELECTIVE CATALYTIC REDUCTION OF $NO_x$

The present invention relates to a zeolitic material having a BEA-type framework structure comprising copper and iron in ion-exchanged form and to a process for the production of said material which does not involve the use of an organotemplate. Furthermore, the present invention relates to the use of the zeolitic material having a BEA-type framework structure comprising copper and iron in ion-exchanged form in a catalytic process, in particular as a catalyst for selective catalytic reduction (SCR), as well as to a method for the treatment of $NO_x$ by selective catalytic reduction (SCR) in which said zeolitic material is employed.

INTRODUCTION

Zeolite beta is one of the most prominent and extensively studied zeolitic materials with a BEA-type framework structure. Zeolite beta comprises $SiO_2$ and $Al_2O_3$ in its framework and is featured by a three-dimensional 12-membered-ring (12MR) pore/channel system. Said zeolite is considered to be an important microporous catalyst, which has been widely used in petroleum refining and fine chemical industries. The synthesis of zeolite beta was first described in U.S. Pat. No. 3,308,069, wherein tetraethylammonium cation is used as the structure directing agent. Although considerable effect has been made for improving the known preparation procedures as well as seeking alternative routes thereto, including the use of other structure directing agents such as dibenzyl-1,4-diazabicyclo[2,2,2]octane in U.S. Pat. No. 4,554,145 and dibenzylmethylammonium in U.S. Pat. No. 4,642,226, the conventional processes for the preparation of zeolite beta generally rely on the use of organic template compounds. U.S. Pat. No. 5,139,759, for example, discloses that the absence of an organic template compound in the synthetic procedure of zeolite beta led to a ZSM-5 product instead.

Recently, it has been discovered that zeolite beta and related materials may be prepared in the absence of organotemplates. Xiao et al. reported in Chemistry of Materials, 2008, 20, pp. 4533-4535 and the Supporting Information that the synthesis of zeolite beta can be successfully carried out by using zeolite beta seed crystals without an organotemplate in the synthetic mixture. WO 2010/146156 A discloses an organotemplate-free synthesis of zeolitic materials having a BEA-type framework structure, and in particular an organotemplate-free synthesis of zeolite beta. Majano et al. reported in Chemistry of Materials, 2009, 21, pp. 4184-4191 that Al-rich zeolite beta materials having Si/Al ratios as low as 3.9 may be obtained from reactions employing seeding in the absence of organic templates. Besides the considerable advantage of not having to use costly organotemplates which require subsequent removal from the microporous framework by calcination, the new organotemplate-free synthetic methodology further allows for the preparation of Al-rich zeolite beta with unprecedently low Si/Al ratios.

It is well known in the art that both synthetic and natural zeolites can be used as catalysts for various chemical reactions, including the selective catalytic reduction (SCR) of nitrogen oxides with ammonia in the presence of oxygen. More specifically, in the so-called SCR process, the reduction of nitrogen oxides with ammonia to form nitrogen and $H_2O$ is selectively enhanced by the catalysts, whereas other unwanted reactions, for example, the oxidation of ammonia by oxygen to the formation of undesirable side products such as $N_2O$, should be avoided. The catalysts employed in the SCR process ideally should be able to retain good catalytic activity over a wide range of temperature, for example, 200° C. to 600° C. or higher, under hydrothermal conditions and in the presence of sulfur compounds. High temperature and hydrothermal conditions are often encountered in practice, such as during the regeneration of the catalyzed soot filter, a component necessary for the removal of soot particles in the exhaust gas treatment system.

Amongst others, Fe- and Cu-promoted zeolite catalysts have been found to be effective for the selective catalytic reduction of nitrogen oxides with ammonia. However, these two types of zeolites are known to have certain limits with respect to their catalytic activities. For example, as reported by Metkar et al. in Applied catalysis B: Environmental, 2012, 111-112, pp. 67-80, the Cu-exchanged zeolites are more effective at low temperatures (i.e., ≤350° C.), whereas the Fe-exchanged zeolites are more effective at high temperatures (i.e., ≥400° C.). In view of said differently preferred working-temperatures for Cu-exchanged and Fe-exchanged zeolites, notable effects have been made in an attempt to obtain an improved "all-around" zeolitic catalyst which is active at a relatively broad temperature range. Metkar et al. have investigated the catalytic performance of a mixture of Cu-exchanged zeolite and Fe-exchanged zeolite. Said mixture, however, displays a $NO_x$ conversion which is nearly an average of the performance of individual zeolites. Moreover, Yang et al. (Journal of Physical Chemistry, 2012, 116, pp. 23322-23331) investigated a bimetal zeolite beta which is prepared by sequentially ion-exchanging copper and iron into a commercial zeolite from Zeolyst International. However, such a bimetal zeolite beta does not show an enhanced $NO_x$ conversion efficiency at a low temperature of 150° C. when compared to the Cu-exchanged zeolite beta. Moreover, the catalytic activity of said bimetal zeolite beta at temperatures higher than 300° C. is observed to decrease much faster than the Cu-exchanged zeolite (see FIG. 4 of Yang et al.).

Recently, WO2013/118063 A1, on the other hand, discloses Fe-containing zeolite beta and Cu-containing zeolite beta prepared from an organotemplate-free synthesis and their use in the selective catalytic reduction of $NO_x$. It has been found that said zeolite beta display a higher catalytic activity than the counterpart zeolite obtained from a templated synthesis. Furthermore, the Cu-exchanged sample and the Fe-exchanged sample of zeolite beta from an organotemplate-free synthesis respectively show a sustained catalytic performance after severe conditions of use as simulated by a hydrothermal aging process.

Thus, there is an on-going task to provide improved zeolitic catalysts which may exhibit a high activity over a broad temperature range for SCR applications. In particular, a high activity at low temperatures around 200° C. is highly desired for a practical use of the SCR catalysts. There is an also need to provide improved catalysts that combines the advantages of Fe-exchanged zeolite and Cu-exchanged zeolite in the SCR reactions. On the other hand, a high sulfur resistance is further desired especially in the case of a high sulfur content in the reactant gas, such as is presently the case in the Asian region, in particular in China and India.

Although notable progress has been made in the recent past with respect to the synthesis of new zeolitic materials having the BEA-type framework structure, there still remains a considerable need for the provision of new zeolitic materials having improved characteristics. This applies in particular in view of the numerous catalytic applications in which they are currently used, and notably in SCR.

DETAILED DESCRIPTION

It is therefore the object of the present invention to provide an improved zeolitic material and in particular an improved zeolitic catalyst. More specifically, the present invention aims at providing a zeolitic catalyst displaying a high catalytic activity in a broad working-temperature range as well as a high sulfur resistance, in particular with respect to the applications in selective catalytic reduction (SCR), i.e., for the conversion of nitrogen oxide with a reducing agent to environmentally inoffensive compounds such as nitrogen and oxygen.

Thus, it has surprisingly been found that the zeolitic material sequentially ion-exchanged with copper and iron, wherein said zeolitic material having a BEA-type framework structure may be obtained from an organotemplate-free synthesis and wherein the Cu-exchange is prior to the Fe-exchange, displays an improved performance as a SCR catalyst when compared to the Cu-exchanged or Fe-exchanged zeolite. This result is quite unexpected in contrast to the conventional bi-metalic-exchanged zeolitic materials known from the art having the BEA-type framework structure obtained from an organotemplate-mediated synthesis, wherein the corresponding bimetal-exchanged zeolite does not display an enhanced catalytic performance compared to the single-metal-exchanged zeolites in the SCR reactions.

In particular, as will be demonstrated in the experimental section, it has been observed that the inventive bimetal-exchanged (i.e., Cu/Fe-exchanged) zeolitic material having a BEA-type framework structure obtainable from an organotemplate-free synthesis shows a high catalytic activity at both low and high temperatures when compared to the Cu-exchanged zeolite and the Fe-exchanged zeolite. Therefore, the Cu/Fe-exchanged zeolite from an organotemplate-free synthesis unexpectedly outperforms the advantageous effects of the two single-metal-exchanged zeolites in their preferred working-temperature ranges, such that the inventive Cu/Fe-exchanged zeolite is found to be superior to a mechanical mixture of said two single-metal-exchanged zeolites for the SCR reactions.

It has also surprisingly been found that the sequence of the ion-exchange with copper and iron during the preparation of the zeolitic material has an essential effect on the obtained product, since the inventive Cu/Fe-exchanged zeolite beta displays a higher catalytic activity, in particular in the high temperature range, than the Fe/Cu-exchanged zeolite beta which is exchanged with iron prior to copper.

Finally, it has further quite unexpectedly been found that the Cu/Fe-exchanged zeolite of the present invention shows an improved sulfur resistance in the catalytic reactions, wherein all the more surprisingly, the inventive Cu/Fe-exchanged zeolite can be effectively regenerated even after being sulfated.

Therefore, the present invention relates to a process for the production of a zeolitic material having a BEA-type framework structure comprising $YO_2$ and $X_2O_3$, wherein said process comprises the steps of
(1) preparing a mixture comprising one or more sources for $YO_2$ and one or more sources for $X_2O_3$;
(2) crystallizing the mixture obtained in step (1);
(3) subjecting the zeolitic material having a BEA-type framework structure obtained in step (2) to an ion-exchange procedure with copper; and
(4) subjecting the Cu-exchanged zeolitic material obtained in step (3) to an ion-exchange procedure with iron;
wherein Y is a tetravalent element, and X is a trivalent element, wherein the mixture provided in step (1) and crystallized in step (2) further comprises seed crystals comprising one or more zeolitic materials having a BEA-type framework structure, and wherein the mixture provided in step (1) and crystallized in step (2) does not contain an organotemplate as a structure-directing agent.

According to the present invention, there is no particular restriction as to the number and/or types of zeolitic materials which are obtained in step (2) of the inventive process, provided that they have the BEA framework structure and comprise $YO_2$ and $X_2O_3$. Thus, by way of example, the zeolitic material may comprise one or more zeolites having the BEA framework structure which are selected from the group consisting of zeolite beta, [B—Si—O]-BEA, [Ga—Si—O]-BEA, [Ti—Si—O]-BEA, Al-rich beta, CIT-6, tschernichite, and pure silica beta, wherein preferably the zeolitic material obtained in step (2) comprises zeolite beta, wherein even more preferably the zeolitic material having a BEA-type framework structure is zeolite beta.

According to the inventive process, at no point does the mixture provided in step (1) and crystallized in step (2) contain more than an impurity of an organic structure directing agent specifically used in the synthesis of zeolitic materials having a BEA-type framework structure, in particular specific tetraalkylammonium salts and/or related organotemplates such as tetraethylammonium and/or dibenzylmethylammonium salts, and dibenzyl-1,4-diazabicyclo[2,2,2]octane. Such an impurity can, for example, be caused by organic structure directing agents still present in seed crystals used in the inventive process. Organotemplates contained in seed crystal material may not, however, participate in the crystallization process since they are trapped within the seed crystal framework and therefore may not act structure directing agents within the meaning of the present invention.

Furthermore, $YO_2$ and $X_2O_3$ are comprised in the BEA-type framework structure as structure building elements, as opposed to non-framework elements which can be present in the pores and cavities formed by the framework structure and typical for zeolitic materials in general.

According to the present invention, a zeolitic material having a BEA-type framework structure is obtained in step (2). Said material comprises $YO_2$, wherein Y stands for any conceivable tetravalent element, Y standing for either one or several tetravalent elements. Preferred tetravalent elements according to the present invention include Si, Sn, Ti, Zr, and Ge, and combinations thereof. More preferably, Y stands for Si, Ti, or Zr, or any combination of said trivalent elements, even more preferably for Si and/or Sn. According to the present invention, it is particularly preferred that Y stands for Si.

Furthermore, according to the process of the present invention $YO_2$ can be provided in step (1) in any conceivable form, provided that a zeolitic material having a BEA-type framework structure comprising $YO_2$ can be crystallized in step (2). Preferably, $YO_2$ is provided as such and/or as a compound which comprises $YO_2$ as a chemical moiety and/or as a compound which (partly or entirely) is chemically transformed to $YO_2$ during the inventive process. In preferred embodiments of the present invention, wherein Y stands for Si or for a combination of Si with one or more further tetravalent elements, the source for $SiO_2$ provided in step (1) can be any conceivable source. There can therefore be used, for example, all types of silica and silicates, preferably fumed silica, silica hydrosols, reactive amorphous solid silicas, silica gel, silicic acid, water glass, sodium metasilicate hydrate, sesquisilicate or disilicate, colloidal silica, pyrogenic silica, silicic acid esters, tetraalkoxysilanes, or mixtures of two or more of these compounds.

In preferred embodiments of the inventive process, wherein the mixture according to step (1) comprises one or more sources for $SiO_2$, said source preferably comprises one or more compounds selected from the group consisting of silica and/or silicates, preferably one or more silicates and one or more silicas. Among the preferred silicates, alkali metal silicates are particularly preferred, the alkali metal is preferably selected from the group consisting of Li, Na, K, Rb, and Cs, wherein more preferably the alkali metal is Na and/or K, and wherein even more preferably the alkali metal is Na. Accordingly to particularly preferred embodiments, the one or more sources for $SiO_2$ preferably comprised in the mixture provided in step (1) comprises water glass, preferably sodium and/or potassium water glass, and even more preferably sodium water glass. According to said embodiments, it is yet further preferred that the one or more sources for $SiO_2$ comprises sodium and/or potassium silicate, and even more preferably sodium silicate, wherein in particularly preferred embodiments of the present invention, the source for $SiO_2$ is sodium silicate.

Among the preferred silicas which may be comprised in the one or more sources for $YO_2$ in step (1) these may include any one of silica, preferably fumed silica, silica hydrosols, reactive amorphous solid silicas, silica gel, silicic acid, colloidal silica, pyrogenic silica, silicic acid esters, tetraalkoxysilanes, or mixtures of two or more of these compounds. According to particularly preferred embodiments, the one or more sources for $SiO_2$ comprises one or more silicas selected from the group consisting of fumed silica, silica hydrosols, reactive amorphous solid silicas, silica gel, colloidal silica, pyrogenic silica, or mixtures of two or more of these compounds. It is, however, preferred according to the present invention that the one ore more silicas include one or more silica hydrosols and/or one or more colloidal silicas, and even more preferably one or more colloidal silicas.

Therefore, it is preferred according to the present invention that the one or more sources for $YO_2$ provided in step (1) comprises one or more silicates and/or silicas, preferably one or more silicates and one or more silicas,
wherein the one or more silicates preferably comprise one or more alkali metal silicates,
wherein the alkali metal is preferably selected from the group consisting of Li, Na, K, Rb, and Cs, wherein more preferably the alkali metal is Na and/or K, and wherein even more preferably the alkali metal is Na, wherein more preferably the one or more silicates comprise water glass, more preferably sodium and/or potassium silicate, and more preferably sodium silicate, and
wherein the one or more silicas preferably comprise one or more silica hydrosols and/or one or more colloidal silicas, more preferably one or more colloidal silicas.

Thus, embodiments of the present invention are preferred wherein the one or more sources for $YO_2$ provided in step (1) comprises one or more silicates, preferably one or more alkali metal silicates, wherein the alkali metal is preferably selected from the group consisting of Li, Na, K, Rb, and Cs, wherein more preferably the alkali metal is Na and/or K, and wherein even more preferably the alkali metal is Na. Furthermore, according to said particular and preferred embodiments, it is further preferred that the one or more sources for $YO_2$ further comprises one or more silicas in addition to the one or more silicates, preferably one or more silica hydrosols and/or one or more colloidal silicas, and even more preferably one or more colloidal silicas in addition to the one or more silicates. Alternatively or in addition thereto, it is further preferred according to the present invention that the one or more silicates provided in step (1) comprise water glass, preferably sodium and/or potassium silicate, and even more preferably sodium silicate.

Furthermore, as regards the zeolitic material having a BEA-type framework structure obtained in step (2) comprising $X_2O_3$, X may stand for any conceivable trivalent element, X standing for either one or several trivalent elements. Preferred trivalent elements according to the present invention include Al, B, In, and Ga, and combinations thereof. More preferably, Y stands for Al, B, or In, or any combination of said trivalent elements, even more preferably for Al and/or B. According to the present invention, it is particularly preferred that X stands for Al.

If, for example, boron is incorporated, for example free boric acid and/or borates and/or boric esters, such as, for example, triethyl borate or trimethyl borate, can be used as starting materials.

Concerning the one or more sources for $X_2O_3$ which are provided in step (1), there is no particular restriction as to the $X_2O_3$ can be provided in any conceivable form, provided that a zeolitic material having a BEA-type framework structure comprising $X_2O_3$ can be crystallized in step (2). Preferably, $X_2O_3$ is provided as such and/or as a compound which comprises $X_2O_3$ as a chemical moiety and/or as a compound which (partly or entirely) is chemically transformed to $X_2O_3$ during the inventive process.

In more preferred embodiments of the present invention, wherein X stands for Al or for a combination of Al with one or more further trivalent elements, the source for $Al_2O_3$ provided in step (1) can be any conceivable source. There can be used for example any type of alumina and aluminates, aluminum salts such as, for example, alkali metal aluminates, aluminum alcoholates, such as, for example, aluminum triisopropylate, or hydrated alumina such as, for example, alumina trihydrate, or mixtures thereof. Preferably, the source for $Al_2O_3$ comprises at least one compound selected from the group consisting of alumina and aluminates, preferably aluminates, more preferably alkali metal aluminates, wherein the alkali metal is preferably selected from the group consisting of Li, Na, K, Rb, and Cs, wherein more preferably the alkali metal is Na and/or K, and wherein even more preferably the alkali metal is Na. Among the preferred alkali metal aluminates, the at least one source preferably comprises sodium and/or potassium aluminate, more preferably sodium aluminate. In particularly preferred embodiments of the present invention, the source for $Al_2O_3$ is sodium aluminate.

There is no particular restriction according to the present invention as to the amounts of the one or more sources for $YO_2$ and $X_2O_3$ respectively provided in step (1), provided that an organotemplate-free zeolitic material having a BEA-type framework structure comprising both $YO_2$ and $X_2O_3$ may be crystallized in step (2). Thus, by way of example, the $YO_2:X_2O_3$ molar ratio of the mixture according to step (1) may range anywhere from 1 to 200, wherein preferably the $YO_2:X_2O_3$ molar ratio of the mixture ranges from 5 to 100, more preferably from 10 to 50, more preferably from 15 to 40, more preferably from 20 to 30, and even more preferably from 23 to 25. According to particularly preferred embodiments of the present invention, the $YO_2:X_2O_3$ molar ratio of the mixture provided in step (1) is comprised in the range of from 23.5 to 24.

In embodiments of the present invention which are further preferred, the zeolitic material obtained in step (2) of the inventive process comprises one or more alkali metals M, wherein M is preferably selected from the group consisting of Li, Na, K, Cs, and combinations of two or more thereof. According to particularly preferred embodiments, the one or more alkali metals M are selected from the group consisting of Li, Na, K, and combinations of two or more thereof, wherein even more preferably the alkali metal M is Na and/or K, and even more preferably Na. In particularly preferred embodiments of the inventive process, the alkali metal is partly or entirely contained in the at least one source for $YO_2$ and/or $X_2O_3$ provided in step (1), wherein preferably, the alkali metal is entirely contained therein.

In general, the alkali metal M can be contained in the mixture according to step (1) of the inventive process in any conceivable amount, provided that a zeolitic material having a BEA-type framework structure is crystallized in step (2). Thus, by way of example, the $M:YO_2$ molar ratio in the mixture provided in step (1) may range anywhere from 0.05 to 5, wherein preferably the mixture provided in step (1) and crystallized in step (2) displays a $M:YO_2$ molar ratio comprised in the range of from 0.1 to 2, more preferably or from 0.3 to 1, more preferably of from 0.4 to 0.8, more preferably of from 0.45 to 0.7, and even more preferably from 0.5 to 0.65. According to particularly preferred embodiments, the $M:YO_2$ molar ratio in the mixture according to step (1) ranges from 0.55 to 0.6

Thus, in general, any conceivable amounts of one or more sources for $YO_2$, of the one or more sources for $X_2O_3$, and of the one or more alkali metals M optionally comprised in the mixture provided in step (1) can be used in the inventive process, again provided that an organotemplate-free zeolitic material having a BEA-type framework structure may be crystallized in step (2). Thus, by way of example, the $YO_2:X_2O_3:M$ molar ratios in the mixture according to step (1) may range anywhere from (1 to 200):1:(0.5 to 100). It is, however, preferred according to the present invention that the $YO_2:X_2O_3:M$ molar ratios displayed by the mixture provided in step (1) and crystallized in step (2) are comprised in the range of from (5 to 100):1:(5 to 75), more preferably of from (10 to 50):1:(8 to 50), more preferably of from (15 to 40):1:(10 to 30), more preferably of from (20 to 30):1:(11 to 20), and even more preferably of from (23 to 25):1:(12 to 15). According to particularly preferred embodiments, the $YO_2:X_2O_3:M$ molar ratio of the mixture provided in step (1) and crystallized in step (2) is comprised in the range of from (23.5 to 24):1:(13 to 14).

According to the process of the present invention, seed crystals are provided in step (1), wherein said seed crystals comprise a zeolitic material having a BEA-type framework structure. In general, said seed crystals can comprise any zeolitic material having a BEA-type framework structure, provided that a zeolitic material having a BEA-type framework structure is crystallized in step (2). Preferably, the zeolitic material having a BEA-type framework structure comprised in the seed crystals is a zeolitic material obtained according to the inventive process. More preferably, the zeolitic material having a BEA-type framework structure comprised in the seed crystals is the same as the zeolitic material having a BEA-type framework structure which is then crystallized in step (2). Particularly preferred are seed crystals comprising zeolite beta, more preferably zeolite beta which has been obtained according to the inventive process. In particularly preferred embodiments, the seed crystals are zeolite beta crystals, preferably zeolite beta crystals obtained according to the inventive process.

According to the inventive process, any suitable amount of seed crystals can be provided in the mixture according to step (1), provided that a zeolitic material having a BEA-type framework structure is crystallized in step (2). In general, the amount of seed crystals contained in the mixture according to step (1) ranges from 0.1 to 30 wt.-% based on 100 wt.-% of $YO_2$ in the at least one source for $YO_2$, wherein preferably from 0.5 to 20 wt.-% of seed crystals are provided in the mixture crystallized in step (2). More preferably, the amount of seed crystals contained in the mixture according to step (1) ranges from 1 to 10 wt.-%, more preferably from 1.5 to 5 wt.-%, and even more preferably from 2 to 4 wt.-%. According to particularly preferred embodiments, the amount of seed crystals provided in the mixture according to step (1) ranges from 2.5 to 3.5 wt.-%

In step (1) according to the present invention, the mixture can be prepared by any conceivable means, wherein mixing by agitation is preferred, preferably by means of stirring.

According to the present invention, the mixture according to step (1) of the inventive process preferably further comprises one or more solvents. In this respect, any conceivable solvents may be used in any suitable amount, provided that a zeolitic material having a BEA-type framework structure comprising $YO_2$ and $X_2O_3$ can be obtained from crystallization in step (2). Thus, by way of example, the one or more solvents may be chosen from water, organic solvents, and mixtures thereof, preferably from the group consisting of deionized water, alcohols, and mixtures thereof. More preferably from the group consisting of deionized water, methanol, ethanol, propanol, and mixtures thereof. According to particularly preferred embodiments of the present invention, only water and preferably only deionized water is contained in the mixture according to step (1) as the solvent.

As regards the amount of the one or more solvents preferably provided in the mixture according to step (1) of the inventive process, again, no particular restriction applies provided that an organotemplate-free zeolitic material having a BEA-type framework structure comprising $YO_2$ and $X_2O_3$ may be crystallized in step (2). Thus, by way of example, according to particularly preferred embodiments of the present invention wherein the solvent comprises water, the $H_2O:YO_2$ molar ratio of the mixture may range anywhere from 5 to 100, wherein preferably, the $H_2O:YO_2$ molar ratio is comprised in the range of from 10 to 50, more preferably of from 13 to 30, and even more preferably of from 15 to 20. According to particularly preferred embodiments of the present invention, the $H_2O:YO_2$ molar ratio of the mixture provided in step (1) and crystallized in step (2) of the inventive process is comprised in the range of from 17 to 18.

In general, step (2) according to the inventive process can be conducted in any conceivable manner, provided that a zeolitic material having a BEA-type framework structure is crystallized from the mixture according to step (1). The mixture can be crystallized in any type of vessel, wherein a means of agitation is preferably employed, preferably by rotation of the vessel and/or stirring, and more preferably by stirring the mixture.

According to the inventive process, the mixture is preferably heated during at least a portion of the crystallization process in step (2). In general, the mixture can be heated to any conceivable temperature of crystallization, provided that a zeolitic material having a BEA-type framework structure is crystallized from the mixture. Preferably, the mixture is heated to a temperature of crystallization ranging from 80 to 200° C., more preferably from 90 to 180° C., more preferably from 100 to 160° C., more preferably from 110 to 140° C., and even more preferably from 115 to 130° C.

The preferred heating in step (2) of the inventive process can be conducted in any conceivable manner suitable for the crystallization of a zeolitic material having a BEA-type framework structure. In general, heating may be conducted at one temperature of crystallization or vary between different temperatures. Preferably, a heat ramp is used for reaching the temperature of crystallization, wherein the heating rate preferably ranges from 10 to 100° C./h, more preferably from 20 to 70° C./h, more preferably from 25 to 60° C./h, more preferably from 30 to 50° C./h, and even more preferably from 35 to 45° C./h.

In preferred embodiments of the present invention, the mixture according to step (1) is subjected in step (2) to a pressure which is elevated with regard to normal pressure. The term "normal pressure" as used in the context of the present invention relates to a pressure of 101,325 Pa in the ideal case. However, this pressure may vary within boundaries known to the person skilled in the art. By way of example, this pressure can be in the range of from 95,000 to 106,000 or of from 96,000 to 105,000 or of from 97,000 to 104,000 or of from 98,000 to 103,000 or of from 99,000 to 102,000 Pa.

In preferred embodiments of the inventive process wherein a solvent is present in the mixture according to step (1), it is furthermore preferred that heating in step (2) is conducted under solvothermal conditions, meaning that the mixture is crystallized under autogenous pressure of the solvent which is used, for example by conducting heating in an autoclave or other crystallization vessel suited for generating solvothermal conditions. In particularly preferred embodiments wherein the solvent comprises or consists of water, preferably of deionized water, heating in step (2) is accordingly preferably conducted under hydrothermal conditions.

The apparatus which can be used in the present invention for crystallization is not particularly restricted, provided that the desired parameters for the crystallization process can be realized, in particular with respect to the preferred embodiments requiring particular crystallization conditions. In the preferred embodiments conducted under solvothermal conditions, any type of autoclave or digestion vessel can be used.

In general, the duration of the crystallization process in step (2) of the inventive process is not particularly limited. In preferred embodiments involving heating of the mixture according to step (1), said crystallization process is conducted for a period ranging from 5 to 160 h, more preferably from 10 to 140 h, more preferable from 20 to 120 h, more preferably from 40 to 100 h, and even more preferably from 60 to 80 h.

According to preferred embodiments of the present invention, wherein the mixture is heated in step (2), said heating may be conducted during the entire crystallization process or during only one or more portions thereof, provided that a zeolitic material having the BEA-type framework structure is crystallized. Preferably, heating is conducted during the entire duration of crystallization.

In general, the process of the present invention can optionally comprise further steps for the work-up and/or further physical and/or chemical transformation of the zeolitic material having a BEA-type framework structure crystallized in step (2) from the mixture provided in step (1). The crystallized material can for example be subject to any number and sequence of isolation and/or washing and/or drying procedures, wherein the zeolitic material obtained from crystallization in step (2) is preferably subject to one or more isolation procedures, more preferably to one or more isolation and one or more washing procedures, and even more preferably to one or more isolation, one or more washing, and one or more drying procedures.

As regards preferred embodiments of the present invention wherein the organotemplate-free zeolitic material crystallized in step (2) is subject to one or more isolation procedures, said isolation of the crystallized product can be achieved by any conceivable means. Preferably, isolation of the crystallized product is achieved by means of filtration, ultrafiltration, diafiltration, centrifugation and/or decantation methods, wherein filtration methods can involve suction and/or pressure filtration steps.

With respect to the one or more optional washing procedures, any conceivable solvent can be used. Washing agents which may be used are, for example, water, alcohols, such as methanol, ethanol or propanol, or mixtures of two or more thereof. Examples of mixtures are mixtures of two or more alcohols, such as methanol and ethanol or methanol and propanol or ethanol and propanol or methanol and ethanol and propanol, or mixtures of water and at least one alcohol, such as water and methanol or water and ethanol or water and propanol or water and methanol and ethanol or water and methanol and propanol or water and ethanol and propanol or water and methanol and ethanol and propanol. Water or a mixture of water and at least one alcohol, preferably water and ethanol, is preferred, deionized water being very particularly preferred as the only washing agent.

Preferably, the separated zeolitic material is washed until the pH of the washing agent, preferably the washwater, is in the range of from 6 to 8, preferably from 6.5 to 7.5, as determined via a standard glass electrode.

Furthermore, as regards the one or more optional drying steps, in principle, any conceivable means of drying can be used. The drying procedures however preferably include heating and/or applying vacuum to the zeolitic material having a BEA-type framework structure. In alternatively preferred embodiments of the present invention, the one or more drying steps may involve spray drying, and preferably spray granulation of the zeolitic material crystallized in step (2) of the inventive process.

In embodiments which comprise at least one drying step, the drying temperatures are preferably in the range of from 25° C. to 150° C., more preferably of from 60 to 140° C., more preferably of from 70 to 130° C. and even more preferably in the range of from 75 to 125° C. The durations of drying are preferably in the range of from 2 to 60 h, more preferably in the range of 6 to 48 hours, and even more preferably of from 12 to 24 h.

In general, the optional washing and/or drying procedures comprised in the inventive process can be conducted in any conceivably order and repeated as often as desired.

Thus, according to the inventive process it is preferred that after step (2) and prior to step (3) said process further comprises one or more of the following steps of:
  (i) isolating the zeolitic material having a BEA-type framework structure obtained in step (2), preferably by filtration; and
  (ii) optionally washing the zeolitic material having a BEA-type framework structure obtained in step (2); and/or
  (iii) optionally drying the zeolitic material having a BEA-type framework structure obtained in step (2);

wherein the steps (i) and/or (ii) and/or (iii) can be conducted in any order, and wherein one or more of said steps is preferably repeated one or more times.

Preferably, the inventive process comprises at least one step (i) of isolating the zeolitic material crystallized according to step (2), more preferably by filtration thereof. According to the inventive process it is further preferred that after the at least one step (i) of isolation, the zeolitic material is subject to at least one step (iii) of drying, wherein more preferably the zeolitic material is subject to at least one step (ii) of washing prior to the at least one drying step. In a particularly preferred embodiment, the zeolitic material crystallized according to step (2) is subject to at least one step (i) of isolating, followed by at least one step (ii) of washing, followed by at least one step (iii) of drying.

According to a further embodiment of the inventive process which is alternatively preferred, the zeolitic material crystallized in step (2) is directly subject to one or more steps of drying, preferably to one or more steps of spray drying or of spray granulation, wherein it is particularly preferred that said one or more steps of spray drying or spray granulation are performed without isolating or washing the zeolitic material beforehand. Directly subjecting the mixture obtained from step (2) of the inventive process to a spray drying or spray granulation stage has the advantage that isolation and drying is performed in a single stage. Consequently, according to this embodiment of the present invention, an even more preferred process is provided wherein not only removal of organotemplate compounds is avoided, but also the number of post-synthesis workup steps is minimized, as a result of which the organotemplate-free zeolitic material having a BEA-type framework structure can be obtained from a highly simplified process.

According to the inventive process, the zeolitic material crystallized in step (2) is sequentially subject to the ion-exchange procedures in steps (3) and (4). The term "ion-exchange" in the present invention generally refers to non-framework ionic elements in the zeolitic material being exchanged against other ionic-elements, wherein the non-framework ionic elements are present in the zeolitic material as counter-ions to the zeolitic framework. As regards the ion-exchange procedures, there is no particular restriction either regarding the specific impregnation method which is applied, nor with respect to whether said step is repeated and, if yes, the number of times said step is repeated.

According to the inventive process, a solvent or solvent mixture is preferably used to dissolve the metal (i.e., copper or iron) compounds for the ion-exchange procedures. There is no particular restriction as to the type of the solvent which may be used, provided that said metal compounds may be solvated therein. Thus, by way of example, said solvent or solvent mixture is inorganic solvents and/or organic solvents, preferably selected from the group consisting of water, methanol, ethanol, propanol, butanol, pentanol, acetone, benzene, chlorobenzene, toluene, pentane, hexane, cyclohexane, heptane and combinations of two or more thereof, more preferably selected from the group consisting of water, ethanol, propanol, benzene, toluene and combinations of two or more thereof. Even more preferably, the solvent or solvent mixture used to dissolve the copper or iron compounds for the ion-exchange procedure is water or toluene, preferably water.

As regards the amount of the solvents or solvent mixture preferably used in the ion-exchange procedures according to steps (3) and (4), there is again no particular restriction according to the inventive process, provided that copper and iron may be effectively exchanged as non-framework elements in the zeolitic material. Thus, by way of example, an excess of solvent or solvent mixture may be used in the ion-exchange procedures, wherein the solvated metal (i.e., copper for step (3) and iron for step (4)) may enter the porous system of the zeolitic material and, in counterpart, ions contained in the zeolitic material against which copper or iron is exchanged are suitably solvated in the solvent or solvent mixture and accordingly allowed to exit the porous system of the zeolitic material. Alternatively, however, ion-exchange may be achieved with a volume of solvent or a solvent mixture which slightly exceeds or approximately corresponds to or is slightly inferior to the porous volume of the zeolitic material such that copper or iron solvatized in the solvent or solvent mixture enters the porous system of the zeolitic material by a capillary action according to an insipient wetness impregnation technique. According to specific embodiments of the present invention which employs said ion-exchange technique, the ion-exchange process directly takes place within the porous system of the zeolitic material without any ions necessarily leaving the zeolitic material via excess solvent.

As regards the ion-exchange procedures of the present invention, there is not restriction as to how the metal copper or iron is introduced into the exchangeable sites of the zeolitic material. By way of example, the copper or iron compounds may be dissolved in the solvent or solvent mixture to form copper or iron ions, so that said ions may then diffuse into the exchangeable sites of the zeolitic material. Alternatively, the copper or iron compounds are dissolved in the solvent or solvent mixture, and then impregnated to the zeolitic material by incipient wetness methods; said impregnated zeolitic material is further subject to calcination so that the metal copper or iron may migrate into the exchangeable sites of the zeolitic material, wherein preferably calcination leads to the decomposition of the copper or iron compounds such as to generate the ionic form thereof which may then be ion-exchanged against counter-ions to the zeolite framework structure and more preferably to non-copper and non-iron counter-ions to the zeolite framework structure.

Concerning the amount of solvent which is used for the procedure of step (3) and/or (4), no particular restriction applies such that according to the present invention any suitable amount of solvent may be employed provided that the copper and iron may respectively be ion-exchanged against the counter-ions of the zeolite framework. Thus, by way of example, a liquid to solid weight ratio ranging anywhere from 0.1 to 20 may be used. According to the present invention, it is however preferred that the liquid to solid weight ratio being the weight ratio of the solvent or solvent mixture to the zeolitic material, is in the range of from 1 to 15, more preferably of from 2 to 12, more preferably of from 3 to 10, more preferably of from 4 to 9, and even more preferably of from 5 to 8. According to the present invention, it is particularly preferred that the liquid to solid weight ratio employed in the ion-exchange procedure of step (3) and/or (4) is in the range of from 6 to 7.

According to the present invention it is however alternatively preferred that the amount of solvent employed for the ion-exchange procedure of step (3) and/or (4) of the inventive process is chosen such that it is equal to or is inferior to the volume of solvent which may be absorbed by the micropores of the zeolitic framework such that ion-exchange is preferably performed according to an incipient wetness technique. According to the present invention it is particularly preferred that ion-exchange in at least one of steps (3) and (4) is conducted by an incipient wetness technique wherein more preferably at least step (4) is conducted by incipient wetness, wherein even more preferably only ion-exchange in step (4) is performed by an incipient wetness technique. In particular, without being bound to theory, conducting step (4) using an incipient wetness technique avoids that copper ion-exchanged in step (3) is replaced by iron and then leaves the zeolite via excess solvent as might be observed when using an excess of solvent for the ion-exchange procedure. This applies in particular according to embodiments wherein ion-exchange in step (4) is conducted using a non-polar and/or aprotic solvent such as benzene, chlorobenzene, toluene, pentane, hexane, cyclohexane, heptane and combinations of two or more thereof. Accordingly, it is particularly preferred according to the present invention that ion-exchange in step (4) is conducted using a solvent or solvent mixture selected from the group consisting of benzene, chlorobenzene, toluene, pentane, hexane, cyclohexane, heptane and combinations of two or more thereof, more preferably from the group consisting of benzene, toluene, hexane, heptane and combinations of two or more thereof, wherein more preferably ion-exchange in step (4) is conducted using a solvent mixture comprising toluene, wherein even more preferably toluene is employed as the solvent for ion-exchange in step (4). Thus, it is further particularly preferred according to the present invention that ion-exchange in step (4) is conducted using an incipient wetness technique with a solvent or solvent mixture selected from the group consisting of benzene, chlorobenzene, toluene, pentane, hexane, cyclohexane, heptane and combinations of two or more thereof, more preferably from the group consisting of benzene, toluene, hexane, heptane and combinations of two or more thereof, wherein more preferably ion-exchange in step (4) via incipient wetness is conducted using a solvent mixture comprising toluene, wherein even more preferably toluene is employed as the solvent.

According to the present invention, the amount of copper which is ion-exchanged into the zeolitic material obtained in step (3) is preferably in the range of from 0.1 to 25 wt.-% calculated as CuO. Consequently, the type of the Cu-exchange procedure employed in step (3) is suitably chosen, in particular also with respect to the type and/or amount of solvent or solvent mixture preferably used therein, and repeated one or more times if necessary for achieving a copper loading in the ion-exchanged material which is comprised by the aforementioned inventive range. According to the present invention, it is however preferred that the total amount of copper in the ion-exchanged material obtained in step (3) is in the range of from 0.2 to 20 wt.-%, more preferable of from 0.5 to 15 wt.-%, more preferably of from 0.8 to 10 wt.-%, more preferably of from 1 to 8.0 wt.-%, more preferably of from 1.2 to 7.0 wt.-%, more preferably of from 1.5 to 6.0 wt.-%, and even more preferably of from 2.5 to 5.5 wt.-%. According to particularly preferred embodiments of the invention, the total amount of copper in the zeolitic material is in the range of from 3.0 to 4.0 wt.-%.

According to the present invention, the amount of iron which is ion-exchanged into the zeolitic material obtained in step (4) is preferably also in the range of from 0.1 to 25 wt.-% calculated as $Fe_2O_3$. Consequently, the type of the Fe-exchange procedure employed in step (4) is again suitably chosen, in particular also with respect to the type and/or amount of solvent or solvent mixture preferably used therein, and repeated one or more times if necessary for achieving a iron loading in the ion-exchanged material which is comprised by the aforementioned inventive range. According to the present invention, it is however preferred that the total amount of iron calculated as $Fe_2O_3$ in the ion-exchanged material obtained in step (4) is in the range of from 0.2 to 15 wt.-%, more preferably of from 0.3 to 10 wt.-%, more preferably of from 0.5 to 7.5 wt.-%, more preferably of from 0.7 to 5.0 wt.-%, more preferably of from 0.8 to 4.0 wt.-%, and even more preferably of from 1.0 to 3.5 wt.-%. According to particularly preferred embodiments of the invention, the total amount of iron in the zeolitic material is in the range of from 2.0 to 3.1 wt.-%.

According to preferred embodiments of the present invention, a solvent or solvent mixture is preferably employed for the ion-exchange procedures, wherein the solubility of the metal (i.e., copper or iron) compounds in the solvent or solvent mixture is high enough so that the concentration of said metal compounds in the solvent or solvent mixture is suitable for obtaining a zeolitic material having a loading of the corresponding metal according to particular and/or preferred embodiments of the present invention. It is more preferred that the metal loading of the zeolitic material having a BEA-type framework structure is achieved after five or less ion-exchange procedures with each metal (copper or iron) when using such a solution, preferably after four or less, more preferably after three or less, more preferably after two or three, and even more preferably after only one ion-exchange procedure using such a solution.

As regards the copper compounds used for the Cu-exchange in step (3) of the inventive process, any suitable copper-containing compounds may be used wherein the one or more copper containing compounds preferably comprise copper(I) and/or copper(II) compounds. The one or more copper-containing compounds is preferably a copper(II) compound, and more preferably a copper(II) salt. By way of example, the one or more copper-containing compounds are selected from the group consisting of copper(II) halides, preferably copper(II) chloride and/or copper(II) bromide, more preferably copper(II) chloride, copper(II) perchlorate, copper(II) sulfite, copper(II) hydrogensulfate, copper(II) sulfate, copper(II) nitrite, copper(II) nitrate, copper(II) dihydrogenphosphate, copper(II) hydrogenphosphate, copper(II) phosphate, copper(II) hydrogencarbonate, copper(II) carbonate, copper(II) acetate, copper(II) citrate, copper(II) malonate, copper(II) oxalate, copper(II) tartrate, and mixtures of two or more thereof, wherein more preferably the copper(II) salt is selected from the group consisting of copper(II) chloride and/or copper(II) bromide, preferably copper(II) chloride, copper(II) sulfate, copper(II) nitrate, copper(II) acetate, and mixtures of two or more thereof. According to particularly preferred embodiments of the present invention, the copper compounds used for the Cu-exchange in step (3) comprise copper(II) acetate, wherein more preferably the copper compound is copper(II) acetate.

As regards the iron compounds used for the Fe-exchange in step (4) of the inventive process, any suitable iron-containing compounds may be used. The one or more iron-containing compounds employed in step (4) are preferably selected from the group consisting of iron(II) and iron(III) salts, iron complexes and combinations of two or more thereof. More preferably, the iron-containing compounds are selected from the group consisting of iron sulfate, iron sulfite, iron hydrogensulfate, iron chloride, iron bromide, iron iodide, iron fluoride, iron perchlorate, iron nitrate, iron nitrite, iron phosphate, iron dihydrogenphosphate, iron hydrogenphosphate, iron carbonate, iron hydrogencarbonate, iron acetate, iron citrate, iron malonate, iron oxalate, iron tartrate, hexacyanoferrate salts, ferrocene, ferrocenium salts and combinations of two or more thereof, more preferably from the group consisting of iron sulfate, iron chloride, iron nitrate, ferrocene and the combinations of two or more thereof. According to particularly preferred embodiments of the present invention, the iron containing compounds used for the Fe-exchange in step (4) comprises iron sulfate and/or ferrocene, wherein even more preferably ferrocene is used as the iron compound in step (4).

According to specific embodiments of the present invention, the zeolitic material obtained in step (2) of the inventive process may be optionally ion-exchanged with $H^+$ and/or $NH_4^+$, preferably with $NH_4^+$, and/or optionally calcined prior to the ion-exchange with copper in step (3). According to preferred embodiments of the present invention, the zeolitic material obtained in step (2) is first ion-exchanged with $NH_4^+$ prior to the Cu-exchange in step (3). In this respect, any conceivable ion-exchange procedure such as the treatment of the zeolitic material with a solution of an ammonium salt and in particular with a solution of ammonium salt may be employed for achieving the exchange of ionic non-framework elements contained in the zeolitic material obtained in step (2) against $NH_4^+$. According to said preferred embodiments it is further preferred that the zeolitic material ion-exchanged with $NH_4^+$ is not calcined prior to ion-exchange with copper, such that copper is ion-exchanged against $NH_4^+$ present as counter-ions to the zeolite framework.

Therefore, embodiments of the present invention are further preferred wherein the ion-exchange of the zeolitic material having a BEA-type framework structure in step (3) comprises one or more of the steps of:
  (3a) exchanging one or more of the ionic non-framework elements contained in the zeolitic material having a BEA-type framework structure obtained in step (2) with $H^+$ and/or $NH_4^+$, preferably with $NH_4^+$;
  (3b) subjecting the zeolitic material having a BEA-type framework structure obtained in step (3a) to an ion-exchange procedure with copper.

According to specific embodiments of the present invention, the Cu-exchanged zeolitic material obtained in step (3) is calcined prior to the Fe-exchange procedure in step (4). Said calcination may be conducted at any suitable temperature for any conceivable period provided that the resulting material may be further ion-exchanged with iron for obtaining a Cu/Fe-exchanged material wherein the copper loading is preferably in the range of from 0.1 to 25 wt.-% calculated as CuO, and the iron loading is preferably in the range of from 0.1 to 25 wt.-% calculated as $Fe_2O_3$. By way of example, the calcination temperature may be in the range of from 300 to 850° C., preferably in the range of from 350 to 750° C., more preferably of from 400 to 650° C., more preferably of from 425 to 600° C. and even more preferably of from 450 to 550° C. According to particularly preferred embodiments of the present invention, the zeolitic material obtained in step (3) is calcined at a temperature in the range of from 475 to 525° C. prior to the Fe-exchange in step (4). Furthermore, as regards the duration of the calcination procedure optionally used prior to the Fe-exchange in step (4), the calcination may be conducted for a period ranging from 0.1 to 24 h, preferably from 0.5 to 18 h, more preferably from 1 to 12 h, more preferably from 2 to 10 h, and even more preferably from 2.5 to 7 h. According to particularly preferred embodiments, said calcination procedure prior to the Fe-exchange is performed for a period of from 3 to 5 h.

According to the present invention, the zeolitic material obtained in step (4) of the inventive process may further be subject to a step of calcination. By way of example, the calcination temperature employed in (4) may be in the range of from 300 to 850° C., preferably in the range of from 350 to 750° C., more preferably of from 400 to 650° C., more preferably of from 425 to 600° C. and even more preferably of from 450 to 550° C. According to the present invention, it is particularly preferred that the zeolitic material obtained in step (4) is calcined at a temperature in the range of from 475 to 525° C. Furthermore, as regards the duration of the preferred calcination for the zeolitic material obtained from ion-exchange in step (4), the calcination may be conducted for a period ranging from 0.1 to 24 h, more preferably from 0.2 to 12 h, more preferably from 0.5 to 5 h, and even more preferably from 1 to 3 h. According to particularly preferred embodiments, the calcination procedure for the zeolitic material obtained in step (4) is performed for a period of from 1.5 to 2.5 h.

It is, however, further preferred according to the present invention that ion-exchange with iron in step (4) is conducted such that the actual ion-exchange only or mainly occurs during calcination of the zeolitic material after loading thereof with one or more iron containing compounds. This applies in particular for embodiments wherein the one or more iron compounds contain one or more iron complexes which do not directly react with the zeolitic material upon contact therewith.

Therefore, according to the present invention it is particularly preferred that the Fe-exchange procedure in step (4) comprises the steps of
  (4a) impregnating the Cu-exchanged zeolitic material obtained in step (3) with one or more iron-containing compounds, and
  (4b) calcining the zeolitic material obtained in step (4a).

According to the present invention it is thus particularly preferred that the zeolitic material obtained in step (3) is subject to impregnation with one or more iron containing compounds in (4a), wherein preferably the one or more iron containing compounds are selected from the group consisting of iron complexes, more preferably from the group consisting of iron citrate, iron malonate, iron oxalate, iron tartrate, hexacyanoferrate salts, ferrocene, ferrocenium salts and combinations of two or more thereof, wherein it is particularly preferred that the one or more iron containing compounds employed in step (4a) comprises ferrocene, ferrocene being particularly preferably used as the iron-containing compound in step (4a). Furthermore, it is particularly preferred that in (4a) said one or more iron-containing compounds are impregnated using a solvent selected from the group consisting of non-polar and/or aprotic solvent such as benzene, chlorobenzene, toluene, pentane, hexane, cyclohexane, heptane and combinations of two or more thereof, wherein more preferably impregnation in step (4a) is conducted using a solvent mixture comprising toluene, wherein even more preferably toluene is employed as the solvent for impregnation in step (4a). Thus, it is particularly preferred according to the present invention that impregnation in step (4a) is conducted using one or more iron containing compounds are selected from the group consisting of iron complexes, more preferably from the group consisting of iron citrate, iron malonate, iron oxalate, iron tartrate, hexacyanoferrate salts, ferrocene, ferrocenium salts and combinations of two or more thereof, and employing a solvent selected from the group consisting of non-polar and/or aprotic solvent such as benzene, chlorobenzene, toluene, pentane, hexane, cyclohexane, heptane and combinations of two or more thereof, wherein it is particularly preferred that impregnation is conducted using a solvent mixture comprising toluene, wherein the one or more iron containing compounds comprise ferrocene, wherein even more preferably impregnation in step (4a) is conducted with ferrocene as the iron containing compound and toluene as the solvent.

With respect to the amount of solvent employed for the preferred impregnation procedure of step (4a), as for the inventive process in general, no particular restriction applies such that any suitable amount of solvent may be employed as defined for particular and preferred embodiments of the inventive process in the present application. According the present invention, it is however preferred that the impregnation in step (4a) is conducted such that the amount of solvent is equal to or is inferior to the volume of solvent which may be absorbed by the micropores of the zeolitic framework such that impregnation is preferably performed according to an incipient wetness technique.

As described above, it has been found that a zeolitic material may be provided according to the inventive process displaying unexpected and improved properties, in particular with respect to the catalytic activity thereof. More specifically, it has surprisingly been found that according to the inventive process a zeolitic material having a BEA-type framework structure which is sequentially exchanged with copper and iron may be provided which displays a high catalytic activity in a broad temperature range in the SCR applications.

Therefore, the present invention also relates to a zeolitic material having a BEA-type framework structure which is obtainable and/or obtained according to particular and preferred embodiments of the inventive process as defined in the present application. Within the meaning of the present invention, the term "obtainable" refers to any zeolitic material having a BEA-type framework structure which is either obtained by the process according to the present invention or by any conceivable process which leads to a zeolitic material having a BEA-type framework structure as is obtainable according to the inventive process.

Thus, the present invention also relates to a zeolitic material per se, said zeolitic material having a BEA-type framework structure having an X-ray diffraction pattern comprising at least the following reflections:

| Intensity (%) | Diffraction angle 2θ/° [Cu K(alpha 1)] |
|---|---|
| [11-31] | [21.07-21.27] |
| 100 | [22.12-22.32] |
| [13-33] | [25.01-25.21] |
| [17-37] | [25.53-25.73] |
| [13-33] | [26.78-26.98] |
| [11-31] | [28.39-28.59] |
| [22-42] | [29.24-29.44] |
| [6-26] | [30.00-30.20] |
| [9-29] | [32.86-33.26] |
| [11-31] | [42.90-43.30] | wherein 100% relates to the intensity of the maximum peak in the X-ray powder diffraction pattern, wherein the BEA-type framework structure comprises $YO_2$ and $X_2O_3$, wherein Y is a tetravalent element, and X is a trivalent element, wherein the zeolitic material contains copper and iron in ion-exchanged form, and wherein the ion-exchange with copper is performed prior to the ion-exchange with iron.

Preferably, the zeolitic material having a BEA-type framework structure according to the present invention has an X-ray diffraction pattern comprising at least the following reflections:

| Intensity (%) | Diffraction angle 2θ/° [Cu K(alpha 1)] |
|---|---|
| [11-31] | [21.12-21.22] |
| 100 | [22.17-22.27] |
| [13-33] | [25.06-25.16] |
| [17-37] | [25.58-25.68] |
| [13-33] | [26.83-26.93] |
| [11-31] | [28.44-28.54] |
| [22-42] | [29.29-29.39] |
| [6-26] | [30.05-30.15] |
| [9-29] | [33.01-33.11] |
| [11-31] | [43.05-43.15] | wherein 100% relates to the intensity of the maximum peak in the X-ray diffraction.

More preferably, the inventive zeolitic material having a BEA-type framework structure displaying a powder diffraction pattern according to the present invention is a zeolitic material which is either obtained by the process according to the present invention or by any conceivable process which leads to a zeolitic material having a BEA-type framework structure as may be obtained, i.e. as is obtainable according to the inventive process.

According to the present invention, in the zeolitic material having a BEA-type framework structure, Y stands for any conceivable tetravalent element, Y standing for either one or several tetravalent elements. Preferred tetravalent elements according to the present invention include Si, Sn, Ti, Zr, and Ge, and combinations thereof. More preferably, Y stands for Si, Ti, or Zr, or any combination of said trivalent elements, even more preferably for Si and/or Sn. According to the present invention, it is particularly preferred that Y stands for Si.

Furthermore, as regards $X_2O_3$ further comprised in the framework of the zeolitic material having a BEA structure further, X may stand for any conceivable trivalent element, X standing for either one or several trivalent elements. Preferred trivalent elements according to the present invention include Al, B, In, and Ga, and combinations thereof. More preferably, Y stands for Al, B, or In, or any combination of said trivalent elements, even more preferably for Al and/or B. According to the present invention, it is particularly preferred that X stands for Al.

According to the present invention, there is no particular restriction as to the $YO_2:X_2O_3$ molar ratio displayed by the inventive zeolitic material having a BEA-type framework structure. Thus, in principle, the inventive zeolitic material may have any conceivable $YO_2:X_2O_3$ molar ratio. Accordingly, by way of example, the zeolitic material having a BEA-type framework structure may have an $YO_2:X_2O_3$ molar ratio comprised in the range of anywhere from 2 to 100, wherein preferably, the $YO_2:X_2O_3$ molar ratio is comprised in the range of from 4 to 70, more preferably from 5 to 50, more preferably from 6 to 30, more preferably from 7 to 20, more preferably from 8 to 15, and even more preferably from 9 to 13. According to particularly preferred embodiments, the inventive zeolitic material having a BEA-type framework structure has a $YO_2:X_2O_3$ molar ratio comprised in the range of from 10 to 11.

According to the present invention, there is no particular restriction as to the copper loading of the zeolitic material. Thus, by way of example, the copper loading may range anywhere from 0.1 to 25 wt.-% calculated as CuO and based on the total weight of the zeolitic material, preferably from 0.2 to 20 wt.-%, more preferably from 0.5 to 15 wt.-%, more preferably from 0.8 to 10 wt.-%, more preferably from 1.0 to 8.0 wt.-%, more preferably from 1.2 to 7.0 wt.-%, more preferably from 1.5 to 6.0 wt.-%, and more preferably from 2.5 to 5.5 wt.-%. According to particular preferred embodiments, the inventive zeolitic material has a copper loading in the range of from 3.0 to 4.0 wt.-%.

Furthermore, according to the present invention, there is also no particular restriction as to the iron loading of the zeolitic material. Thus again, by way of example, the iron loading may range anywhere from 0.1 to 25 wt.-% calculated as $Fe_2O_3$ and based on the total weight of the zeolitic material, preferably from 0.2 to 15 wt.-%, more preferably from 0.3 to 10 wt.-%, more preferably from 0.5 to 7.5 wt.-%, more preferably from 0.7 to 5.0 wt.-%, more preferably from 0.8 to 4.0 wt.-%, and more preferably from 1.0 to 3.5 wt.-%. According to particular preferred embodiments, the inventive zeolitic material has an iron loading in the range of from 2.0 to 3.1 wt.-%.

According to the present invention, there is further no particular restriction as to the molar ratio of $Cu:X_2O_3$ of the zeolitic material. The molar ratio of $Cu:X_2O_3$ of the zeolitic material may range from 0.01 to 2.4, preferably from 0.02 to 1.9, more preferably from 0.05 to 1.45, more preferably from 0.08 to 0.8, more preferably from 0.1 to 0.7, more preferably from 0.14 to 0.6, and more preferably from 0.2 to 0.5. Even more preferably, the molar ratio of $Cu:X_2O_3$ of the zeolitic material is in the range of from 0.3 to 0.4.

Furthermore, according to the present invention, there is no particular restriction as to the molar ratio of $Fe:X_2O_3$ of the zeolitic material. The molar ratio of $Fe:X_2O_3$ of the zeolitic material may range from 0.01 to 2.4, preferably from 0.02 to 1.4, more preferably from 0.03 to 1.0, more preferably from 0.05 to 0.7, more preferably from 0.07 to 0.5, more preferably from 0.08 to 0.4, and more preferably from 0.1 to 0.35. Even more preferably, the molar ratio of $Fe:X_2O_3$ of the zeolitic material is in the range of from 0.25 to 0.30.

Depending on the specific needs of its application, the inventive material according to particular and preferred embodiments of the present application can be employed as such, like in the form of a powder, a spray powder or a spray granulate obtained from above-described separation techniques, e.g. decantation, filtration, centrifugation, or spraying.

In many industrial applications, it is often desired on the part of the user not to employ the zeolitic material as powder or sprayed material, i.e. the zeolitic material obtained by the separation of the material from its mother liquor, optionally including washing and drying, and subsequent calcination, but a zeolitic material which is further processed to give moldings. Such moldings are required particularly in many industrial processes, e.g. in many processes wherein the zeolitic material of the present invention is employed as catalyst or adsorbent.

Accordingly, the present invention also relates to a molding comprising the copper and iron ion-exchanged zeolitic material of the present invention having a BEA-type framework structure.

In general, the powder or sprayed material can be shaped without any other compounds, e.g. by suitable compacting, to obtain moldings of a desired geometry, e.g. tablets, cylinders, spheres, or the like.

Preferably, the powder or sprayed material is admixed with or coated by a suitable refractory binder. In general, suitable binders are all compounds which impart adhesion and/or cohesion between the zeolitic material particles to be bonded which goes beyond the physisorption which may be present without a binder. Examples of such binders are metal oxides, such as, for example, $SiO_2$, $Al_2O_3$, $TiO_2$, $ZrO_2$ or MgO or clays, or mixtures of two or more of these compounds. Naturally occurring clays which can be employed include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. In addition, the zeolitic material according to the present invention can be composited with a porous matrix material such as silica-alumina, silica-magnesia, silica-zirconia, silica-thoria, silica-beryllia and silica-titania as well as ternary compositions such as silica-alumina-thoria, silica-alumina-zirconia, silica-alumina-magnesia and silica-magnesia-zirconia.

Also preferably, the powder or the sprayed material, optionally after admixing or coating by a suitable refractory binder as described above, is formed into a slurry, for example with water, which is deposited upon a suitable refractory carrier. The slurry may also comprise other compounds such as, e.g., stabilizers, defoamers, promotors, or the like. Typically, the carrier comprises a member, often referred to as a "honeycomb" carrier, comprising one or more refractory bodies having a plurality of fine, parallel gas flow passages extending therethrough. Such carriers are well known in the art and may be made of any suitable material such as cordierite or the like.

In general, the zeolitic material according to any of the particular and preferred embodiments as described in the present application can be used as molecular sieve, adsorbent, catalyst, catalyst support or binder thereof. Especially preferred is the use as catalyst. For example, the zeolitic material can be used as molecular sieve to dry gases or liquids, for selective molecular separation, e.g. for the separation of hydrocarbons or amides; as ion exchanger; as chemical carrier; as adsorbent, in particular as adsorbent for the separation of hydrocarbons or amides; or as a catalyst. Most preferably, the zeolitic material according to the present invention is used as a catalyst.

According to a preferred embodiment of the present invention, the zeolitic material according to any of the particular and preferred embodiments as described in the present application is used in a catalytic process, preferably as a catalyst and/or catalyst support, and more preferably as a catalyst. In general, the zeolitic material of the invention can be used as a catalyst and/or catalyst support in any conceivable catalytic process, wherein processes involving the conversion of at least one organic compound is preferred, more preferably of organic compounds comprising at least one carbon-carbon and/or carbon-oxygen and/or carbon-nitrogen bond, more preferably of organic compounds comprising at least one carbon-carbon and/or carbon-oxygen bond, and even more preferably of organic compounds comprising at least one carbon-carbon bond. Thus, by way of example, the zeolitic material may be used as a catalyst and/or catalyst support in a fluid catalytic cracking (FCC) process. According to a further embodiment of the present invention, the zeolitic material of the invention is preferably used in a catalytic process involving the conversion of at least one compound comprising at least one nitrogen-oxygen bond.

Thus, according to the present invention, the zeolitic material having a BEA-type framework structure is preferably used for the oxidation of $NH_3$, in particular for the oxidation of $NH_3$ slip in diesel systems; for the decomposition of $N_2O$; for soot oxidation; for emission control in Advanced Emission Systems such as Homogeneous Charge Compression Ignition (HCCI) engines; as additive in fluid catalytic cracking (FCC) processes; as catalyst in organic conversion reactions; or as catalyst in "stationary source" processes. Therefore, the present invention also relates to a method of oxidizing $NH_3$, in particular of oxidizing $NH_3$ slip in diesel systems, by contacting a stream containing $NH_3$ with a catalyst containing the zeolitic material having a BEA-type framework structure according to the present invention under suitable oxidizing conditions; to a method of decomposing of $N_2O$ by contacting a stream containing $N_2O$ with a catalyst containing the zeolitic material having a BEA-type framework structure according to the present invention under suitable decomposition conditions; to a method of controlling emissions in Advanced Emission Systems such as Homogeneous Charge Compression Ignition (HCCI) engines by contacting an emission stream with a catalyst containing the zeolitic material having a BEA-type framework structure according to the present invention under suitable conditions; to a fluid catalytic cracking FCC process wherein the zeolitic material having a BEA-type framework structure according to the present invention is employed as additive; to a method of converting an organic compound by contacting said compound with a catalyst containing the zeolitic material having a BEA-type framework structure according to the present invention under suitable conversion conditions; to a "stationary source" process wherein a catalyst is employed containing the zeolitic material having a BEA-type framework structure according to the present invention.

According to a particularly preferred embodiment of the present invention, however, the zeolitic material according to any of the particular and preferred embodiments as described in the present application is used as a catalyst and/or catalyst support, preferably as a catalyst in a selective catalytic reduction (SCR) process for the selective reduction of nitrogen oxides $NO_x$.

Consequently, the present invention also relates to the use of a zeolitic material according to any of the particular and preferred embodiments as described in the present application in a catalytic process, preferably as a catalyst, more preferably in selective catalytic reduction (SCR), wherein the zeolitic material is preferably used in the treatment of industrial or automotive exhaust gas, preferably in the treatment of automotive exhaust gas.

Accordingly, the present invention also relates to a method for selectively reducing nitrogen oxides $NO_x$ by contacting a gas stream containing $NO_x$ with a catalyst containing the zeolitic material having a BEA-type framework structure according to any of the particular and preferred embodiments as described in the present application, in particular under suitable reducing conditions. Within the meaning of the present invention, the terms "nitrogen oxides" and "$NO_x$" designate nitrogen monoxide (NO), nitrogen dioxide ($NO_2$), and/or mixtures thereof, and preferably designate a mixture of NO and $NO_2$.

Therefore, the present invention further relates to a method for the treatment of $NO_x$ by selective catalytic reduction (SCR) comprising:
(a) providing a catalyst comprising a zeolitic material having a BEA-type framework structure according to any of the particular and preferred embodiments as described in the present application; and
(b) contacting a gas stream comprising $NO_x$ with the catalyst provided in step (a).

According to the use of the inventive catalyst and/or to the inventive method for the treatment of $NO_x$, there is no particular restriction as to the way or form in which the inventive catalyst is used or in which the inventive catalyst is provided in step (a) of the inventive method, provided that is may be used as a catalyst and, more specifically, provided that it is suited for the treatment of $NO_x$ by SCR in the inventive method. Thus, by way of example, when preparing specific catalytic compositions or compositions for different purposes, it is conceivable to blend the zeolitic material according to the present invention having a BEA-type framework structure with at least one other catalytically active material or a material being active with respect to the intended purpose. It is also possible to blend at least two different inventive materials which may differ in the $YO_2$:$X_2O_3$ ratio, preferably in the $SiO_2$:$Al_2O_3$ ratio, and/or in the presence or absence of a further metal such as a transition metal and/or in the specific amounts of a further metal such as a transition metal, in addition to iron and copper contained in the inventive zeolitic material. It is also possible to blend at least two different inventive materials with at least one other catalytically active material or a material being active with respect to the intended purpose.

The catalysts of the present invention may also be provided in the form of extrudates, pellets, tablets or particles of any other suitable shape, for use as a packed bed of particulate catalyst, or as shaped pieces such as plates, saddles, tubes, or the like.

Also, the catalyst may be disposed on a substrate. The substrate may be any of those materials typically used for preparing catalysts, and will usually comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is disposed as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 400 or more gas inlet openings (i.e., cells) per square inch (2.54 cm×2.54 cm) of cross section.

The substrate can also be a wall-flow filter substrate, where the channels are alternately blocked, allowing a gaseous stream entering the channels from one direction (inlet direction), to flow through the channel walls and exit from the channels from the other direction (outlet direction). The catalyst composition can be coated on the flow through or wall-flow filter. If a wall flow substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alpha-alumina, an aluminosilicate, and the like.

The substrates useful for the catalysts of embodiments of the present invention may also be metallic in nature and be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium, and the like. The surface or the metal substrates may be oxidized at high temperatures, e.g., 1000° C. and higher, to improve the resistance to corrosion of the alloys by forming an oxide layer on the surfaces of the substrates. Such high temperature-induced oxidation may enhance the adherence of the refractory metal oxide support and catalytically promoting metal components to the substrate.

In alternative embodiments, zeolitic material according to the present invention having a BEA-type framework structure may be deposited on an open cell foam substrate. Such substrates are well known in the art, and are typically formed of refractory ceramic or metallic materials.

Most preferably, the zeolitic material according to any of the particular and preferred embodiments as described in the present application is used as a molded catalyst, still more preferably as a molded catalyst wherein the zeolitic material is deposited on a suitable refractory carrier, still more preferably on a "honeycomb" carrier, for the selective reduction of nitrogen oxides $NO_x$ according to the preferred use of the inventive material or as the catalyst comprising a zeolitic material according to step (a) of the inventive method for the treatment of $NO_x$ by selective catalytic reduction.

As regards the contacting of the gas stream with the catalyst comprising a zeolitic material having a BEA-type framework structure according to particular and preferred embodiments as described in the present application, there is no particular restriction as to the mode or the conditions in which said contacting takes place, provided that it is suited for engaging the SCR reaction between the catalyst and the gas stream containing $NO_x$ in step (b) of the inventive method. According to preferred embodiments of the present invention, the contacting takes place at an elevated temperature compared to ambient temperature, more preferably at a temperature comprised in the range of anywhere from 150 to 700° C., wherein the temperature of contacting is more preferably comprised in the range of from 200 to 650° C., more preferably of from 250 to 600° C., more preferably of from 300 to 550° C., more preferably of from 350 to 525° C., and even more preferably of from 400 to 500° C. According to particularly preferred embodiments of the inventive method, the temperature of contacting in step (b) is comprised in the range of from 425 to 475° C.

According to alternative embodiments of the inventive method which are particularly preferred however, the contacting at least partly takes place under so-called "cold-start" conditions as are, for example, typically encountered in the treatment of automotive exhaust gas. In particular, within the meaning of the present invention, the contacting of a gas stream comprising $NO_x$ under "cold-start" conditions implies that said contacting takes place at lower temperatures than required for the optimal activity of the inventive catalyst according to any of the particular and preferred embodiments described in the present application which is used for SCR in the inventive method. According to the present invention, it is however preferred that "cold-start" conditions refer to the conditions and in particular to the temperature typically encountered in automotive applications during the first phase directly following the ignition of the combustion engine, and in particular when the combustion engine has not been in operation for a certain period, such that the temperature of the exhaust gas upon contact with the catalyst and/or the temperature of the catalyst itself which is employed in the inventive method is and/or are below the temperature required for optimal activity of the catalyst. Within the meaning of the present invention, the "temperature of optimal activity of the catalyst" refers in particular to the lowest temperature at which the catalyst, depending on the particular composition and temperature of the gas stream contacting the catalyst in the inventive method as well as the further parameters including the pressure and time of contact of the gas stream containing $NO_x$ with the catalyst, displays the maximum activity with respect to the treatment of $NO_x$ in the SCR process.

Thus, in general, according to said particularly preferred embodiments of the inventive method, the temperature of "cold-start" conditions is any temperature below the temperature of optimal activity of the catalyst employed in the inventive method, wherein preferably the temperature is comprised in the range of from 50 to 500° C. below the temperature of optimal catalyst activity, more preferably of from 100 to 400° C. below, more preferably 150 to 350° C. below, more preferably 200 to 300° C. below, and even more preferably or from 225 to 275° C. below the temperature of optimal activity of the catalyst employed in the inventive method. Therefore, according to an alternative embodiment of the inventive method which is particularly preferred, depending on the specific catalyst according to particular and preferred embodiments of the present invention which is used in the inventive method, as well as on the specific composition of the gas stream comprising $NO_x$ and the conditions of contacting used therein, the temperature of contacting in step (b) is comprised in the range of from 50 to 500° C., wherein preferably the temperature of contacting is comprised in the range of from 90 to 400° C., more preferably of from 120 to 300° C., more preferably of from 150 to 250° C., and even more preferably of from 180 to 220° C.

Concerning the gas stream comprising $NO_x$ which is contacted with the catalyst in step (b) of the inventive method, there is no particular restriction as to the further component which may be contained therein, provided that the treatment of $NO_x$ by SCR in step (b) is possible. According to preferred embodiments of the present invention, the gas stream further comprises one or more reducing agents, and more preferably one or more reducing agents which are active in the SCR process when simultaneously contacted with both the catalyst and $NO_x$ contained in the gas stream. In general, any suitable reducing agent may be employed, wherein it is preferred that the reducing agent comprises urea and/or ammonia. In particular, the selective reduction of nitrogen oxides wherein the zeolitic material according to the inventive method is employed as catalytically active material is preferably carried out in the presence ammonia or urea. While ammonia is the reducing agent of choice for stationary power plants, urea is the reducing agent of choice for mobile SCR systems. Typically, the SCR system is integrated in the engine and vehicle design and, also typically, contains the following main components: SCR catalyst containing the zeolitic material according to the present invention; a urea storage tank; a urea pump; a urea dosing system; a urea injector/nozzle; and a respective control unit.

Thus, according to preferred embodiments of the inventive method, the gas stream further comprises one or more reducing agents, the one or more reducing agents preferably comprising urea and/or ammonia, preferably ammonia.

Therefore, the present invention also relates to a method for selectively reducing nitrogen oxides $NO_x$ in a selective catalytic reduction (SCR) process, wherein a gaseous stream containing nitrogen oxides $NO_x$, preferably further comprising one or more reducing agents, is contacted with the zeolitic material according to any of the particular and preferred embodiments as described in the present application, preferably in the form of a molded catalyst, still more preferably as a molded catalyst wherein the zeolitic material is deposited on a suitable refractory carrier, still more preferably on a "honeycomb" carrier. As regards the one or more reducing agents which are preferably used in the inventive SCR process, there is no particular restriction according to the present invention as to the compounds which may be used, wherein preferably the one or more reducing agents comprise ammonia and/or urea, wherein even more preferably the reducing agent preferably further comprised in the gaseous stream is ammonia and/or urea.

The nitrogen oxides which are reduced using a catalyst containing the zeolitic material according to any of the particular and preferred embodiments as described in the present application may be obtained from any process, in particular as a waste gas stream. Among others, waste gas streams as obtained in processes for producing adipic acid, nitric acid, hydroxylamine derivatives, caprolactame, glyoxal, methyl-glyoxal, glyoxylic acid or in processes for burning nitrogeneous materials may be mentioned.

Thus, according to preferred embodiments of the inventive method, the gas stream comprises one or more $NO_x$ containing waste gases, preferably one or more $NO_x$ containing waste gases from one or more industrial processes, wherein more preferably the $NO_x$ containing waste gas stream comprises one or more waste gas streams obtained in processes for producing adipic acid, nitric acid, hydroxylamine derivatives, caprolactame, glyoxal, methyl-glyoxal, glyoxylic acid or in processes for burning nitrogeneous materials, including mixtures of waste gas streams from two or more of said processes.

Alternatively and particularly preferred, however, is the use of a catalyst containing the zeolitic material according to any of the particular and preferred embodiments as described in the present application for removal of nitrogen oxides $NO_x$ from exhaust gases of internal combustion engines, in particular diesel engines or lean-burn gasoline engines, which operate at combustion conditions with air in excess of that required for stoichiometric combustion, i.e., under lean conditions. In particular, within the meaning of the present invention, "lean conditions" refer to conditions in which the ratio of air to fuel in the combustion mixtures supplied to such engines is maintained considerably above the stoichiometric ratio so that the resulting exhaust gases are "lean", i.e., the exhaust gases are relatively high in oxygen content. More specifically, lean-burn engines operate at an air to fuel ratio exceeding Lambda=1.0, preferably exceeding Lamda=1.2, and even more preferably exceeding Lambda=1.5.

Thus, according to further preferred embodiments of the inventive method, the gas stream comprises a $NO_x$ containing waste gas stream from an internal combustion engine, preferably from an internal combustion engine which operates under lean-burn conditions, and more preferably from a lean-burn gasoline engine or from a diesel engine.

The present invention includes the following embodiments, wherein these include the specific combinations of embodiments as indicated by the respective interdependencies defined therein:

1. Process for the production of a zeolitic material having a BEA-type framework structure comprising $YO_2$ and $X_2O_3$, wherein said process comprises the steps of
   (1) preparing a mixture comprising one or more sources for $YO_2$ and one or more sources for $X_2O_3$;
   (2) crystallizing the mixture obtained in step (1);
   (3) subjecting the zeolitic material having a BEA-type framework structure obtained in step (2) to an ion-exchange procedure with Cu; and
   (4) subjecting the Cu ion-exchanged zeolitic material obtained in step (3) to an ion-exchange procedure with Fe;
   wherein Y is a tetravalent element, and X is a trivalent element,
   wherein the mixture provided in step (1) and crystallized in step (2) further comprises seed crystals comprising one or more zeolitic materials having a BEA-type framework structure, and
   wherein the mixture provided in step (1) and crystallized in step (2) does not contain an organotemplate as a structure-directing agent.

2. The process of embodiment 1, wherein the seed crystals are zeolite beta.

3. The process of embodiment 1 or 2, wherein the zeolitic material obtained in step (2) comprises one or more alkali metals M, wherein M is preferably selected from the group consisting of Li, Na, K, Cs, and combinations of two or more thereof, more preferably from the group consisting of Li, Na, K, and combinations of two or more thereof, wherein more preferably the alkali metal M is Na and/or K, preferably Na.

4. The process of embodiments 1 to 3, wherein Y is selected from the group consisting of Si, Sn, Ti, Zr, Ge, and combinations of two or more thereof, preferably from the group consisting of Si, Ti, Zr, and combinations of two or more thereof, wherein more preferably Y stands for Si and/or Sn, Y preferably being Si.

5. The process of any of embodiments 1 to 4, wherein the one or more sources for $YO_2$ provided in step (1) comprises one or more silicates and/or silicas, preferably one or more silicates and one or more silicas,
   wherein the one or more silicates preferably comprise one or more alkali metal silicates, wherein the alkali metal is preferably selected from the group consisting of Li, Na, K, Rb, and Cs, wherein more preferably the alkali metal is Na and/or K, and
   wherein even more preferably the alkali metal is Na, wherein more preferably the one or more silicates comprise water glass, more preferably sodium and/or potassium silicate, and more preferably sodium silicate, and
   wherein the one or more silicas preferably comprise one or more silica hydrosols and/or one or more colloidal silicas, more preferably one or more colloidal silicas.

6. The process of any of embodiments 1 to 5, wherein X is selected from the group consisting of Al, B, In, Ga, and combinations of two or more thereof, preferably from the group consisting of Al, B, In, and combinations of two or more thereof, wherein more preferably X stands for Al and/or B, X preferably being Al.

7. The process of any of embodiments 1 to 6, wherein the one or more sources for $X_2O_3$ comprises one or more aluminate salts, preferably an aluminate of an alkali metal, wherein the alkali metal is preferably selected from the group consisting of Li, Na, K, Rb, and Cs, wherein more preferably the alkali metal is Na and/or K, and wherein even more preferably the alkali metal is Na.

8. The process of any of embodiments 1 to 7, wherein the molar ratio $YO_2:X_2O_3$ of the mixture according to step (1) ranges from 1 to 200, preferably from 5 to 100, more preferably from 10 to 50, more preferably from 15 to 40, more preferably from 20 to 30, and more preferably from 23 to 25.

9. The process of any of embodiments 1 to 8, wherein the amount of seed crystals comprised in the mixture according to step (1) ranges from 0.1 to 30 wt.-% based on 100 wt.-% of $YO_2$ in the one or more sources for $YO_2$, preferably from 0.5 to 20 wt.-%, more preferably from 1 to 10 wt.-%, more preferably from 1.5 to 5 wt.-%, and more preferably from 2 to 4 wt.-%, and more preferably from 2.5 to 3.5 wt.-%.

10. The process of any of embodiments 1 to 9, wherein the mixture according to step (1) further comprises one or more solvents, wherein said one or more solvents preferably comprise one or more selected from the group consisting of water, organic solvents, and mixtures thereof, more preferably from the group consisting of deionized water, alcohols, and mixtures thereof, more preferably from the group consisting of deionized water, methanol, ethanol, propanol, and mixtures thereof, wherein more preferably the solvent comprises water, and wherein more preferably the solvent is deionized water.

11. The process of embodiment 10, wherein the molar ratio $H_2O:YO_2$ of the mixture according to step (1) ranges from 5 to 100, preferably from 10 to 50, more preferably from 13 to 30, more preferably from 15 to 20, and even more preferably from 17 to 18.

12. The process of any of embodiments 1 to 11, wherein the molar ratio $M:YO_2$ in the mixture according to step (1) ranges from 0.05 to 5, preferably from 0.1 to 2, more preferably from 0.3 to 1, more preferably from 0.4 to 0.8, more preferably from 0.45 to 0.7, more preferably from 0.5 to 0.65, and even more preferably from 0.55 to 0.6.

13. The process of any of embodiments 1 to 12, wherein the molar ratio of $YO_2:X_2O_3:M$ in the mixture according to step (1) ranges from (1 to 200):1:(0.5 to 100), preferably from (5 to 100):1:(5 to 75), more preferably from (10 to 50):1:(8 to 50), more preferably from (15 to 40):1:(10 to 30), more preferably from (20 to 30):1:(11 to 20), more preferably from (23 to 25):1:(12 to 15), and even more preferably from (23.5 to 24):1:(13 to 14).

14. The process of any of embodiments 1 to 13, wherein the crystallization in step (2) involves heating of the mixture, preferably at a temperature ranging from 80 to 200° C., more preferably from 90 to 180° C., more preferably from 100 to 160° C., more preferably from 110 to 140° C., and even more preferably from 115 to 130° C.

15. The process of embodiment 14, wherein the crystallization in step (2) is conducted under solvothermal conditions, preferably under hydrothermal conditions.

16. The process of embodiment 14 or 15, wherein the crystallization in step (2) involves heating of the mixture for a period ranging from 5 to 160 h, more preferably from 10 to 140 h, more preferably from 20 to 120 h, more preferably from 40 to 100 h, and even more preferably from 60 to 80 h.

17. The process of any of embodiments 1 to 16, wherein after step (2) and prior to step (3) said process further comprises one or more of the following steps of:
(i) isolating the zeolitic material having a BEA-type framework structure obtained in step (2), preferably by filtration; and
(ii) optionally washing the zeolitic material having a BEA-type framework structure obtained in step (2); and/or
(iii) optionally drying the zeolitic material having a BEA-type framework structure obtained in step (2);
wherein the steps (i) and/or (ii) and/or (iii) can be conducted in any order, and wherein one or more of said steps is preferably repeated one or more times.

18. The process of any of embodiments 1 to 17, wherein the ion-exchange of the zeolitic material having a BEA-type framework structure in step (3) comprises the steps of
(3a) exchanging one or more of the ionic non-framework elements contained in the zeolitic material having a BEA-type framework structure obtained in step (2) with $H^+$ and/or $NH_4^+$, preferably with $NH_4^+$;
(3b) subjecting the zeolitic material having a BEA-type framework structure obtained in step (3a) to an ion-exchange procedure with Cu.

19. The process of any of embodiments 1 to 18, wherein after step (3) and prior to step (4) the ion-exchanged zeolitic material obtained in step (3) is calcined.

20. The process of any of embodiments 1 to 19, wherein the zeolitic material obtained in step (4) is calcined.

21. The process of any of embodiments 19, 20, or 26, wherein calcination is conducted at a temperature ranging from 300 to 850° C., preferably from 350 to 750° C., more preferably from 400 to 650° C., more preferably from 425 to 600° C., more preferably from 450 to 550° C., and more preferably from 475 to 525° C.

22. The process of any of embodiments 1 to 21, wherein the zeolitic material having a BEA-type framework structure formed in step (2) comprises zeolite beta.

23. The process of any of embodiments 2 to 22, wherein the seed crystals comprise a zeolitic material having a BEA-type framework structure as synthesized according to the process of any one of embodiments 1 to 22, preferably zeolite beta.

24. The process of any of embodiments 1 to 23, wherein the ion-exchange procedure with Cu in step (3) is performed using one or more copper containing compounds, wherein the one or more copper containing compounds are preferably selected from the group consisting of copper(I) and/or copper(II) compounds, preferably a copper(II) compounds, more preferably a copper(II) salts, wherein the one or more copper(II) salts are preferably selected from the group consisting of copper(II) halides, preferably copper(II) chloride and/or copper(II) bromide, more preferably copper(II) chloride, copper(II) perchlorate, copper(II) sulfite, copper(II) hydrogensulfate, copper(II) sulfate, copper(II) nitrite, copper(II) nitrate, copper(II) dihydrogenphosphate, copper(II) hydrogenphosphate, copper(II) phosphate, copper(II) hydrogencarbonate, copper(II) carbonate, copper(II) acetate, copper(II) citrate, copper(II) malonate, copper(II) oxalate, copper(II) tartrate, and mixtures of two or more thereof, wherein more preferably from the group consisting of copper(II) chloride and/or copper(II) bromide, preferably copper(II) chloride, copper(II) sulfate, copper(II) nitrate, copper(II) acetate, and mixtures of two or more thereof, wherein more preferably the one or more copper containing compounds used for ion-exchange in step (3) comprise copper (II) acetate, wherein more preferably copper(II) acetate is used as the copper compound.

25. The process of any of embodiments 1 to 24, wherein the ion-exchange procedure with Fe in step (4) is performed using one or more iron containing compounds, wherein the one or more iron containing compounds are preferably selected from the group consisting of iron(II) and/or iron(III) salts and iron complexes, wherein the one or more iron containing compounds are preferably selected from the group consisting of iron sulfate, iron sulfite, iron hydrogensulfate, iron chloride, iron bromide, iron iodide, iron fluoride, iron perchlorate, iron nitrate, iron nitrite, iron phosphate, iron dihydrogenphosphate, iron hydrogenphosphate, iron carbonate, iron hydrogencarbonate, iron acetate, iron citrate, iron malonate, iron oxalate, iron tartrate, hexacyanoferrate salts, ferrocene, ferrocenium salts and combinations of two or more thereof, more preferably from the group consisting of iron sulfate, iron chloride, iron nitrate, ferrocene and the combinations of two or more thereof, more preferably from iron sulfate and/or ferrocene, and wherein more preferably the iron containing compound is ferrocene.

26. The process of any of embodiments 1 to 25, wherein the ion-exchange procedure with Fe in step (4) comprises the steps of
    (4a) impregnating the Cu ion-exchanged zeolitic material obtained in step (3) with one or more iron containing compounds, and
    (4b) calcining the zeolitic material obtained in step (4a).

27. The process of any of embodiments 1 to 26, wherein the amount of Cu in the zeolitic material obtained in step (4) ranges from 0.1 to 25 wt.-% calculated as CuO and based on the total weight of the zeolitic material, preferably from 0.2 to 20 wt.-%, more preferably from 0.5 to 15 wt.-%, more preferably from 0.8 to 10 wt.-%, more preferably from 1 to 8.0 wt.-%, more preferably from 1.2 to 7.0 wt.-%, more preferably from 1.5 to 6.0 wt.-%, more preferably from 2.5 to 5.5 wt.-%, and more preferably from 3.0 to 4.0 wt.-%; and
    wherein the amount of Fe in the zeolitic material obtained in step (4) ranges from 0.1 to 25 wt.-% calculated as $Fe_2O_3$ and based on the total weight of the zeolitic material, preferably from 0.2 to 15 wt.-%, more preferably from 0.3 to 10 wt.-%, more preferably from 0.5 to 7.5 wt.-%, more preferably from 0.7 to 5.0 wt.-%, more preferably from 0.8 to 4.0 wt.-%, more preferably from 1.0 to 3.5 wt.-%, and more preferably from 2.0 to 3.1 wt.-%.

28. A zeolitic material having a BEA-type framework structure obtainable and/or obtained according to a process as defined in any one of embodiments 1 to 27.

29. A zeolitic material having a BEA-type framework structure, optionally obtainable and/or obtained according to a process as defined in any one of embodiments 1 to 27, having an X-ray diffraction pattern comprising at least the following reflections:

| Intensity (%) | Diffraction angle 2θ/° [Cu K(alpha 1)] |
| --- | --- |
| [11-31] | [21.07-21.27] |
| 100 | [22.12-22.32] |
| [13-33] | [25.01-25.21] |
| [17-37] | [25.53-25.73] |
| [13-33] | [26.78-26.98] |
| [11-31] | [28.39-28.59] |
| [22-42] | [29.24-29.44] |

-continued

| Intensity (%) | Diffraction angle 2θ/° [Cu K(alpha 1)] |
| --- | --- |
| [6-26] | [30.00-30.20] |
| [9-29] | [32.86-33.26] |
| [11-31] | [42.90-43.30] | wherein 100% relates to the intensity of the maximum peak in the X-ray powder diffraction pattern,
wherein the BEA-type framework structure comprises $YO_2$ and $X_2O_3$,
wherein Y is a tetravalent element, and X is a trivalent element,
wherein the zeolitic material contains Cu and Fe in ion-exchanged form,
wherein ion-exchange with Cu is performed prior to ion-exchange with Fe.

30. The zeolitic material of embodiment 29, wherein the $YO_2:X_2O_3$ molar ratio ranges from 2 to 100, preferably from 4 to 70, more preferably from 5 to 50, more preferably from 6 to 30, more preferably from 7 to 20, more preferably from 8 to 15, more preferably from 9 to 13, and even more preferably from 10 to 11.

31. The zeolitic material of embodiment 29 or 30, wherein the loading of the Cu ranges from 0.1 to 25 wt.-% calculated as CuO and based on the total weight of the zeolitic material, preferably from 0.2 to 20 wt.-%, more preferably from 0.5 to 15 wt.-%, more preferably from 0.8 to 10 wt.-%, more preferably from 1.0 to 8.0 wt.-%, more preferably from 1.2 to 7.0 wt.-%, more preferably from 1.5 to 6.0 wt.-%, more preferably from 2.5 to 5.5 wt.-%, and more preferably from 3.0 to 4.0 wt.-%, and
    wherein the loading of the Fe ranges from 0.1 to 25 wt.-% calculated as $Fe_2O_3$ and based on the total weight of the zeolitic material, preferably from 0.2 to 15 wt.-%, more preferably from 0.3 to 10 wt.-%, more preferably from 0.5 to 7.5 wt.-%, more preferably from 0.7 to 5.0 wt.-%, more preferably from 0.8 to 4.0 wt.-%, more preferably from 1.0 to 3.5 wt.-%, and more preferably from 2.0 to 3.1 wt.-%.

32. The zeolitic material of any of embodiments 29 to 31, wherein the molar ratio of $Cu:X_2O_3$ ranges from 0.01 to 2.4, preferably from 0.02 to 1.9, more preferably from 0.05 to 1.45, more preferably from 0.08 to 0.8, more preferably from 0.1 to 0.7, more preferably from 0.14 to 0.6, more preferably from 0.2 to 0.5, and more preferably from 0.3 to 0.4.

33. The zeolitic material of any of embodiments 29 to 32, wherein the molar ratio of $Fe:X_2O_3$ ranges from 0.01 to 2.4, preferably from 0.02 to 1.4, more preferably from 0.03 to 1.0, more preferably from 0.05 to 0.7, more preferably from 0.07 to 0.5, more preferably from 0.08 to 0.4, more preferably from 0.1 to 0.35, and more preferably from 0.25 to 0.30.

34. The zeolitic material of any of embodiments 29 to 33, wherein Y is selected from the group consisting of Si, Sn, Ti, Zr, Ge, and combinations of two or more thereof, preferably from the group consisting of Si, Ti, Zr, and combinations of two or more thereof, wherein more preferably Y stands for Si and/or Sn, Y preferably being Si.

35. The zeolitic material of any of embodiments 29 to 34, wherein X is selected from the group consisting of Al, B, In, Ga, and combinations of two or more thereof, preferably from the group consisting of Al, B, In, and combinations of two or more thereof, wherein more preferably X stands for Al and/or B, X preferably being Al.
36. Method for the treatment of $NO_x$ by selective catalytic reduction (SCR) comprising:
   (a) providing a catalyst comprising a zeolitic material according to any of embodiments 28 to 35; and
   (b) contacting a gas stream comprising $NO_x$ with the catalyst provided in step (a).
37. The method of embodiment 36, wherein the gas stream further comprises one or more reducing agents, the one or more reducing agents preferably comprising urea and/or ammonia, preferably ammonia.
38. The method of embodiment 36 or 37, wherein the gas stream comprises one or more $NO_x$ containing waste gases, preferably one or more $NO_x$ containing waste gases from one or more industrial processes, wherein more preferably the $NO_x$ containing waste gas stream comprises one or more waste gas streams obtained in processes for producing adipic acid, nitric acid, hydroxylamine derivatives, caprolactame, glyoxal, methyl-glyoxal, glyoxylic acid or in processes for burning nitrogenous materials, including mixtures of waste gas streams from two or more of said processes.
39. The method of any of embodiments 36 to 38, wherein the gas stream comprises a $NO_x$ containing waste gas stream from an internal combustion engine, preferably from an internal combustion engine which operates under lean-burn conditions, and more preferably from a lean-burn gasoline engine or from a diesel engine.
40. Use of a zeolitic material according to any of embodiments 28 to 35 in a catalytic process, preferably as a catalyst, more preferably in selective catalytic reduction (SCR) of $NO_x$, and preferably in the treatment of $NO_x$ containing exhaust gas by SCR, wherein more preferably the zeolitic material is used in the treatment of industrial or automotive exhaust gas, preferably in the treatment of automotive exhaust gas.

EXAMPLES

Example 1

Figure 1:
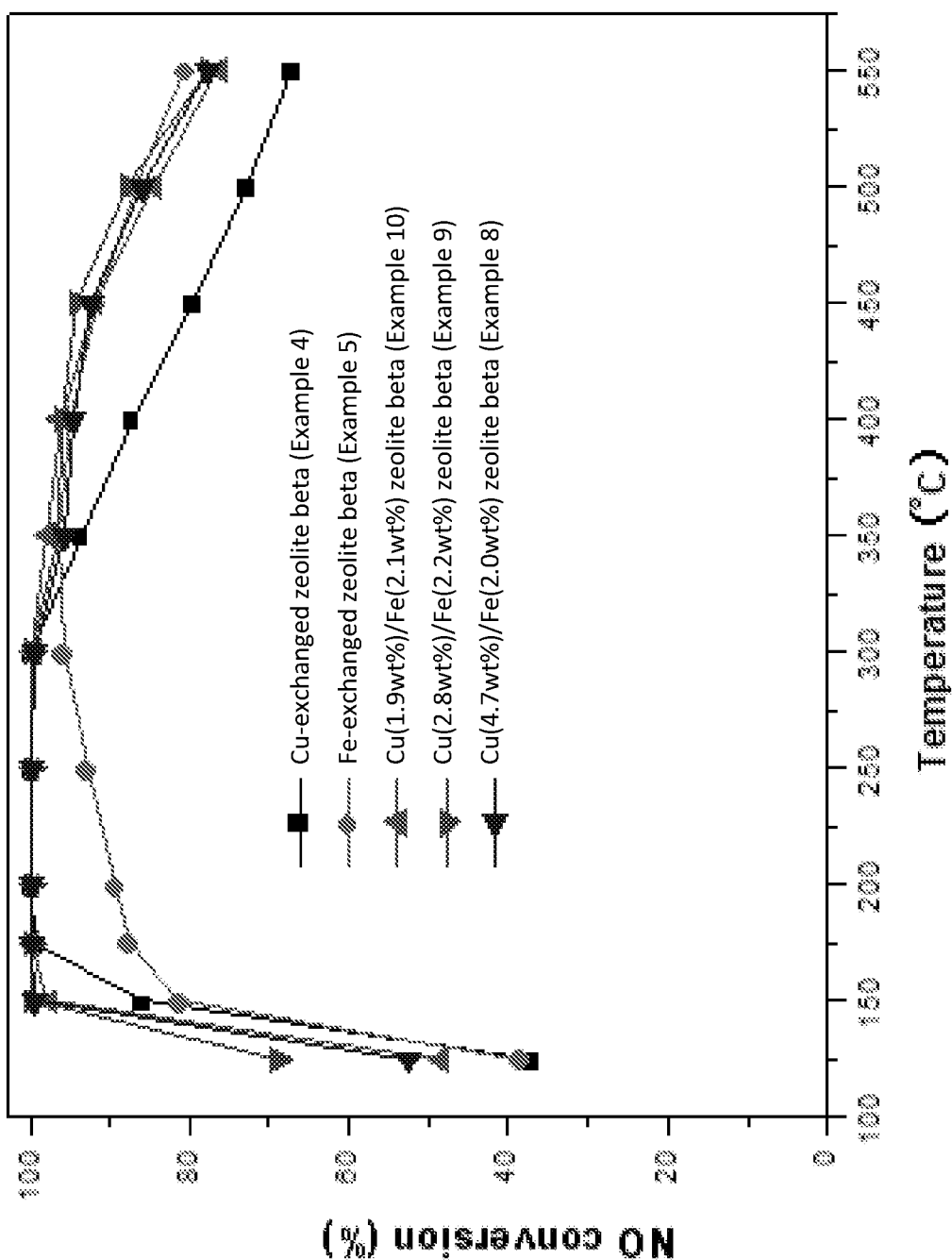
FIG. 1 displays the NO conversion efficiencies of Examples 4, 5 and 8-10 in a SCR reaction. In the figure, the reaction temperature is shown along the abscissa and the NO conversion efficiency is plotted along the ordinate.

Organotemplate-free Synthesis of the Sodium Form of Zeolite Beta 335.1 g of $NaAlO_2$ were dissolved in 7,314 g of $H_2O$ while stirring, followed by addition of 74.5 g of zeolite beta seeds (Product-Nr. CP814C from Zeolyst International which was converted to the H-form by calcination at 500° C. for 5 h, wherein a heat ramp of 1° C./min was used for reaching the calcination temperature). The mixture was transferred into a 20 L autoclave together with 7,340 g of sodium waterglass solution (26.5-28.5 wt % $SiO_2$ and 8.0-8.6 wt % $Na_2O$, from Wöllner GmbH & Co. KG) and 1,436 g of Ludox AS40, affording an aluminosilicate gel with a molar ratio of 1.00 $SiO_2$:0.042 $Al_2O_3$:0.57 $Na_2O$:17.5 $H_2O$. The reaction mixture was heated to a temperature of 120° C., and then maintained at said temperature for 117 h. After having let the reaction mixture cool to room temperature, the solid was separated by filtration, repeatedly washed with deionized water and then dried at 120° C. for 16 h, affording 1,337 g of a white crystalline product.

The chemical analysis indicates that the obtained zeolite has an $SiO_2$:$Al_2O_3$ molar ratio of 10.89, and a sodium content (calculated as $Na_2O$) of 6.69 wt % on the basis of the calcined material. The XRD measurement shows that the obtained crystalline product is zeolite beta.

Example 2

$NH_4$-exchange of the Zeolite Beta from Example 1

1,000 g of the sodium form of zeolite beta as obtained from Example 1 were added into 10,000 g of an aqueous solution of ammonium nitrate (10 wt %). The suspension was heated to 80° C. and then kept at said temperature under continuous stirring for 2 h. The solid was filtered hot (without additional cooling) over a filter press. The filter cake was washed with distilled water of room temperature until the conductivity of the wash water was below 200 μS $cm^{-1}$. The filter cake was then dried for 16 h at 120° C.

The above procedure was repeated once, thus affording $NH_4$-exchanged zeolite beta.

Example 3

Preparation of the H-form of Example 2

The $NH_4$-exchanged zeolitic material from Example 2 was calcined at 500° C. for 5 h to obtain the H-form thereof.

The chemical analysis indicates that the H-form zeolite has a $SiO_2$:$Al_2O_3$ ratio of 10.51 and a sodium content (calculated as $Na_2O$) of 0.08 wt % on the basis of the calcined material.

The specific surface area (BET method) of the H-form product is 458 $m^2$/g. The temperature-programmed ammonia desorption reveals a total uptake of 1.86 mmol ammonia per gram zeolite.

TABLE 1

Results of ammonium desorption measurements

| Peak Number | Temperature at Maximum (° C.) | Quantity (mmol/g) |
|---|---|---|
| 1 | 214.1 | 1.25 |
| 2 | 340.9 | 0.61 |

Example 4

Preparation of Cu-exchanged Zeolite Beta (4.1 wt. %)

1.0 g of the $NH_4$-exchanged zeolite beta from Example 2 was further Cu-exchanged with 100 ml of a 0.006 M $Cu(CH_3COO)_2$ aqueous solution at 40° C. for 4 h. After the Cu-exchange process, the zeolite slurry was filtered, washed with deionized water and dried at 110° C. for 6 h. The obtained zeolite product was then calcined at 500° C. for 4 h.

The Cu content of the obtained Cu-exchanged zeolite is 4.1 wt %, as determined by ICP measurement.

Example 5

Preparation of Fe-exchanged Zeolite Beta (2.7 wt.-%)

1.0 g of the $NH_4$-exchanged zeolite beta from Example 2 was impregnated (using an incipient wetness method) with a toluene solution of ferrocene (0.1 g of ferrocene in 1.04 g of toluene) at room temperature for 48 h. The zeolite product was then calcined at 500° C. for 4 h so that the Fe species enter into the ion-exchangeable sites of zeolite beta.

The Fe content of the obtained Fe-exchanged zeolite is 2.7 wt %, as determined by ICP measurement.

Example 6

Preparation of Cu(4.0 wt %)/Fe(0.6 wt %) Zeolite Beta by Ion-exchange 1.0 g of the $NH_4$-exchanged zeolite beta from Example 2 was Cu-exchanged with 100 ml of a 0.006 M $Cu(CH_3COO)_2$ aqueous solution at 50° C. for 2 h. After the Cu-exchange process, the zeolite slurry was filtered, washed with deionized water and then dried at 110° C. for 6 h. The Cu-exchanged zeolite was then calcined at 500° C. for 4 h.

0.82 g of the Cu-exchanged zeolite was then impregnated (using an incipient wetness method) with a toluene solution of ferrocene (0.028 g of ferrocene in 0.86 g of toluene) at room temperature for 48 h. After the Fe-impregnation process, the zeolite was finally calcined at 500° C. for 2 h to obtain a Cu/Fe-exchanged zeolite beta.

The Cu and Fe contents of the obtained bimetal-exchanged zeolite beta are 4.0 wt % and 0.6 wt %, respectively, as determined by ICP measurement.

Example 7

Preparation of Cu(3.0 wt %)/Fe(1.3 wt %) Zeolite Beta by Ion-exchange 1.0 g of the $NH_4$-exchanged zeolite beta from Example 2 was Cu-exchanged with 100 ml of a 0.0042 M $Cu(CH_3COO)_2$ aqueous solution at 50° C. for 2 h. After the Cu-exchange process, the zeolite slurry was filtered, washed with deionized water and then dried at 110° C. for 6 h. The Cu-exchanged zeolite was then calcined at 500° C. for 4 h.

0.82 g of the Cu-exchanged zeolite was then impregnated (using an incipient wetness method) with a toluene solution of ferrocene (0.058 g of ferrocene in 0.9 g of toluene) at room temperature for 48 h. After the Fe-impregnation process, the zeolite was finally calcined at 500° C. for 2 h to obtain a Cu/Fe-exchanged zeolite beta.

The Cu and Fe contents of the obtained bimetal-exchanged zeolite beta are 3.0 wt % and 1.3 wt %, respectively, as determined by ICP measurement.

Example 8

Preparation of Cu(4.7 wt %)/Fe(2.0 wt %) Zeolite Beta by Ion-exchange 1.0 g of the $NH_4$-exchanged zeolite beta from Example 2 was Cu-exchanged with 100 ml of a 0.01 M $Cu(CH_3COO)_2$ aqueous solution at 50° C. for 2 h. After the Cu-exchange process, the zeolite slurry was filtered, washed with deionized water and then dried at 110° C. for 6 h. The Cu-exchanged zeolite was then calcined at 500° C. for 4 h.

0.81 g of the Cu-exchanged zeolite was then impregnated (using an incipient wetness method) with a toluene solution of ferrocene (0.055 g of ferrocene in 0.85 g of toluene) at room temperature for 48 h. After the Fe-impregnation process, the zeolite was finally calcined at 500° C. for 2 h to obtain a Cu/Fe-exchanged zeolite beta.

The Cu and Fe contents of the obtained bimetal-exchanged zeolite beta are 4.7 wt % and 2.0 wt %, respectively, as determined by ICP measurement.

Example 9

Preparation of Cu(2.8 wt %)/Fe(2.2 wt %) Zeolite Beta by Ion-exchange 1.0 g of the $NH_4$-exchanged zeolite beta from Example 2 was Cu-exchanged with 100 ml of a 0.004 M $Cu(CH_3COO)_2$ aqueous solution at 50° C. for 2 h. After the Cu-exchange process, the zeolite slurry was filtered, washed with deionized water and then dried at 110° C. for 6 h. The Cu-exchanged zeolite was then calcined at 500° C. for 4 h.

0.85 g of the Cu-exchanged zeolite was then impregnated (using an incipient wetness method) with a toluene solution of ferrocene (0.058 g of ferrocene in 0.89 g of toluene) at room temperature for 48 h. After the Fe-impregnation process, the zeolite was finally calcined at 500° C. for 2 h to obtain a Cu/Fe-exchanged zeolite beta.

The Cu and Fe contents of the obtained bimetal-exchanged zeolite beta are 2.8 wt % and 2.2 wt %, respectively, as determined by ICP measurement.

Example 10

Preparation of Cu(1.9 wt %)/Fe(2.1 wt %) Zeolite Beta by Ion-exchange 0.5 g of the $NH_4$-exchanged zeolite beta from Example 2 was Cu-exchanged with 50 ml of a 0.01 M $Cu(CH_3COO)_2$ aqueous solution at 40° C. for 4 h. After the Cu-exchange process, the zeolite slurry was filtered, washed with deionized water and then dried at 110° C. for 6 h. The Cu-exchanged zeolite was then calcined at 500° C. for 4 h.

0.41 g of the Cu-exchanged zeolite was then Fe-exchanged with 50 ml of 0.05 M $FeSO_4$ aqueous solution at room temperature for 24 h. After the Fe-impregnation process, the zeolitic slurry was dried at 110° C. for 6 h, and finally calcined in air at 500° C. for 2 h to obtain a Cu/Fe-exchanged zeolite beta.

The Cu and Fe contents of the obtained bimetal-exchanged zeolite beta are 1.9 wt % and 2.1 wt %, respectively, as determined by ICP measurement.

Example 11

Preparation of Fe(1.2 wt %)/Cu(2.7 wt %) Zeolite Beta by Ion-exchange 1.0 g of the $NH_4$-form zeolite beta from Example 2 was Fe-exchanged with 100 ml of a 0.003 M $FeSO_4$ aqueous solution at room temperature for 24 h. After the ion-exchange process, the zeolite slurry was filtered, washed with deionized water and then dried at 110° C. for 6 h. The Fe-exchanged zeolite was then calcined at 500° C. for 4 h.

0.8 g of the Fe-exchanged zeolite was then impregnated (using an incipient wetness method) with an aqueous solution of $Cu(NO_3)_2$ (0.094 g of $Cu(NO_3)_2$ in 0.64 g of water) at room temperature for 12 h. After the Cu impregnation process, the zeolite was finally calcined at 500° C. for 2 h to obtain a Fe/Cu-exchanged zeolite beta.

The Cu and Fe contents of the obtained bimetal-exchanged zeolite beta are 1.2 wt % and 2.7 wt %, respectively, as determined by ICP measurement.

Example 12

Preparation of a Mixture of Cu-exchanged and Fe-exchanged Zeolite Beta

A comparative sample is prepared by a mechanical mixing of a Cu-exchanged zeolite beta (3.0 wt %) and the Fe-exchanged zeolite beta (1.3 wt %) with an equal mass ratio.

Example 13

Catalytic Testing

The metal(s)-exchanged zeolitic materials chosen from Examples 4-12 were tested in a SCR reaction of reducing NO with $NH_3$. The SCR reaction was carried out in a fixed-bed quartz reactor (inner diameter 6 mm) using ca. 0.18 g of catalyst (40-60 mesh). The catalyst was pre-treated in a $N_2$ stream (flow rate=40 ml/min) at 500° C. for 1 h, and then cooled down to room temperature to introduce the reactant gas mixture, which contained 500 ppm NO 500 ppm $NH_3$, 10% $O_2$, and balance $N_2$. The total flow rate was 400 ml/min, corresponding to a gas hourly space velocity (GHSV) of ca. 80,000 $h^{-1}$. The NO, $NO_2$ and $NO_x$ (=NO+$NO_2$) concentrations were continually measured by a chemiluminescence analyzer (ML9841AS, Monitor, USA). To avoid errors caused by the conversion of ammonia in the analyzer, an ammonia trap containing phosphoric acid solution was installed upstream. All data were obtained when the SCR reaction reached the steady state at each temperature. Accordingly, the catalytic results for the measured Examples are presented in FIGS. 1 and 2.

FIG. 1 shows the catalytic results of two single-metal-exchanged zeolite beta samples (i.e., Examples 4 and 5) and three bimetal-exchanged zeolite beta samples (i.e., Examples 8-10). All three Cu/Fe-exchanged zeolites exhibit a wide temperature window from 125° C. to 550° C. with a NO conversion efficiency from 70% to 99%. Notably, the bimetal-exchanged zeolites display a higher SCR activity than the single-metal-exchanged zeolites at low temperatures. Or alternatively, said bimetal-exchanged zeolites reach a high catalytic reactivity much faster than the single-metal-exchanged zeolites as a function of an increasing temperature. More specifically, it can be seen from FIG. 1 that the Cu/Fe-exchanged zeolites already reach their maximum catalytic reactivity at about 150° C., whereas the Cu-exchanged zeolite and the Fe-exchanged zeolite need respectively a temperature of about 175° C. and 350° C. for reaching their full catalytic reactivity. Furthermore, the inventive bimetal-exchanged zeolites maintain a higher catalytic reactivity than the Cu-exchanged zeolite in the high temperature range from 300° C. to 550° C. Therefore, it has surprisingly been found that the inventive Cu/Fe-exchanged zeolites are superior to both two single-metal-exchanged zeolites in respect of the catalytic reactivity as well as the working-temperature range.

Figure 2:
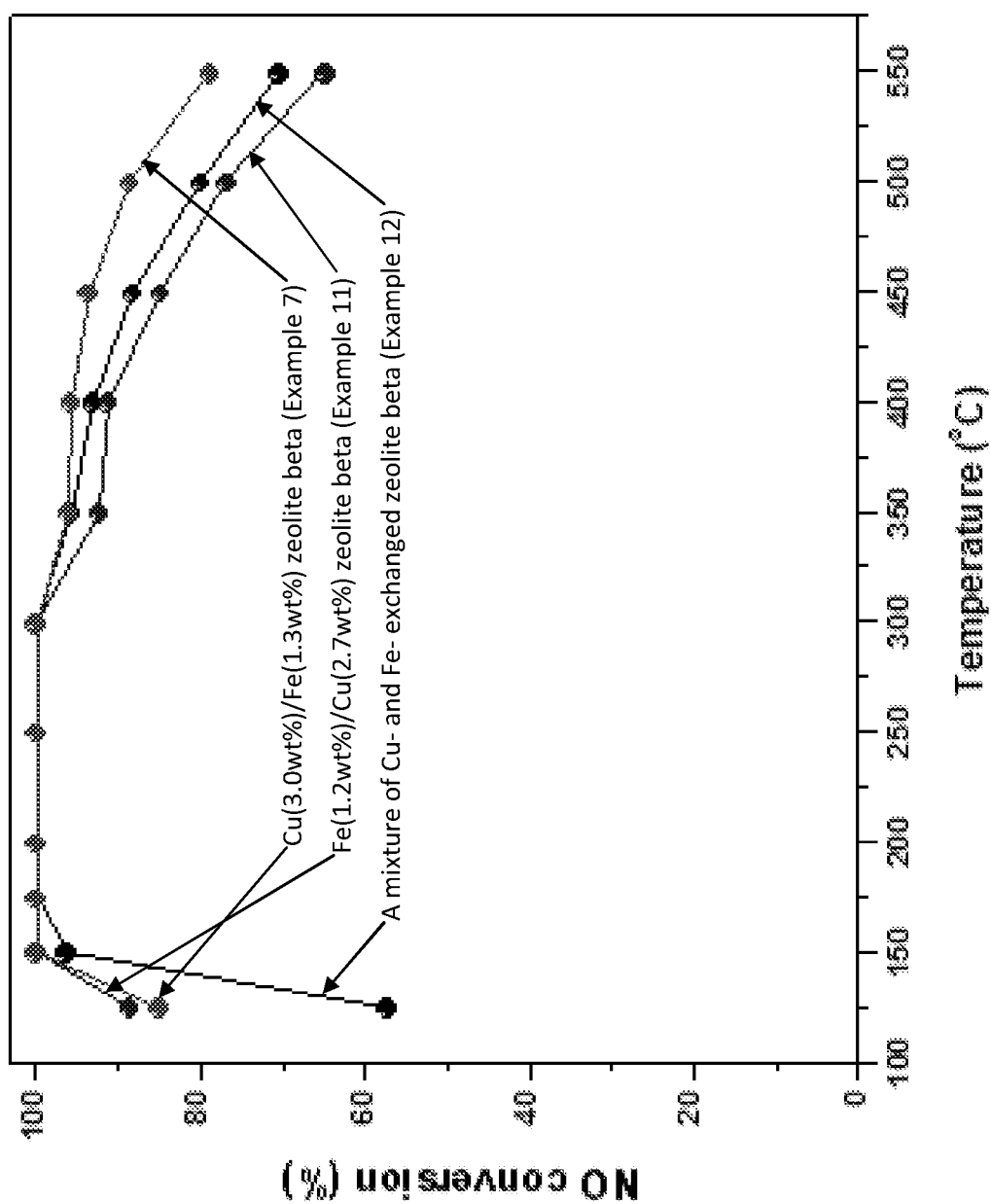
FIG. 2 displays the NO conversion efficiencies of Examples 7, 11 and 12 in a SCR reaction. In the figure, the reaction temperature is shown along the abscissa and the NO conversion efficiency is plotted along the ordinate.

FIG. 2 shows a comparison of the Cu/Fe-exchanged zeolite beta (Example 7), the Fe/Cu-exchanged zeolite beta (Example 11) and a mixture of Cu-exchanged zeolite and Fe-exchanged zeolite (Example 12) in a SCR reaction. The Cu/Fe-exchanged zeolite (Example 7) displays a higher catalytic reactivity than the mechanical mixture (Example 12) not only in the low temperature range (i.e., below 150° C.) but also in the high temperature range (i.e., above 300° C.). Moreover, it is surprisingly found that the Cu/Fe-exchanged zeolite exhibits a superior catalytic reactivity than the Fe/Cu-exchanged zeolite in particular at temperatures exceeding 350° C. Therefore, the sequence of the ion-exchange with Cu and Fe during the preparation process is essential for achieving the high catalytic performance of the inventive zeolite.

Example 14

Sulfur Resistance

Figure 3:
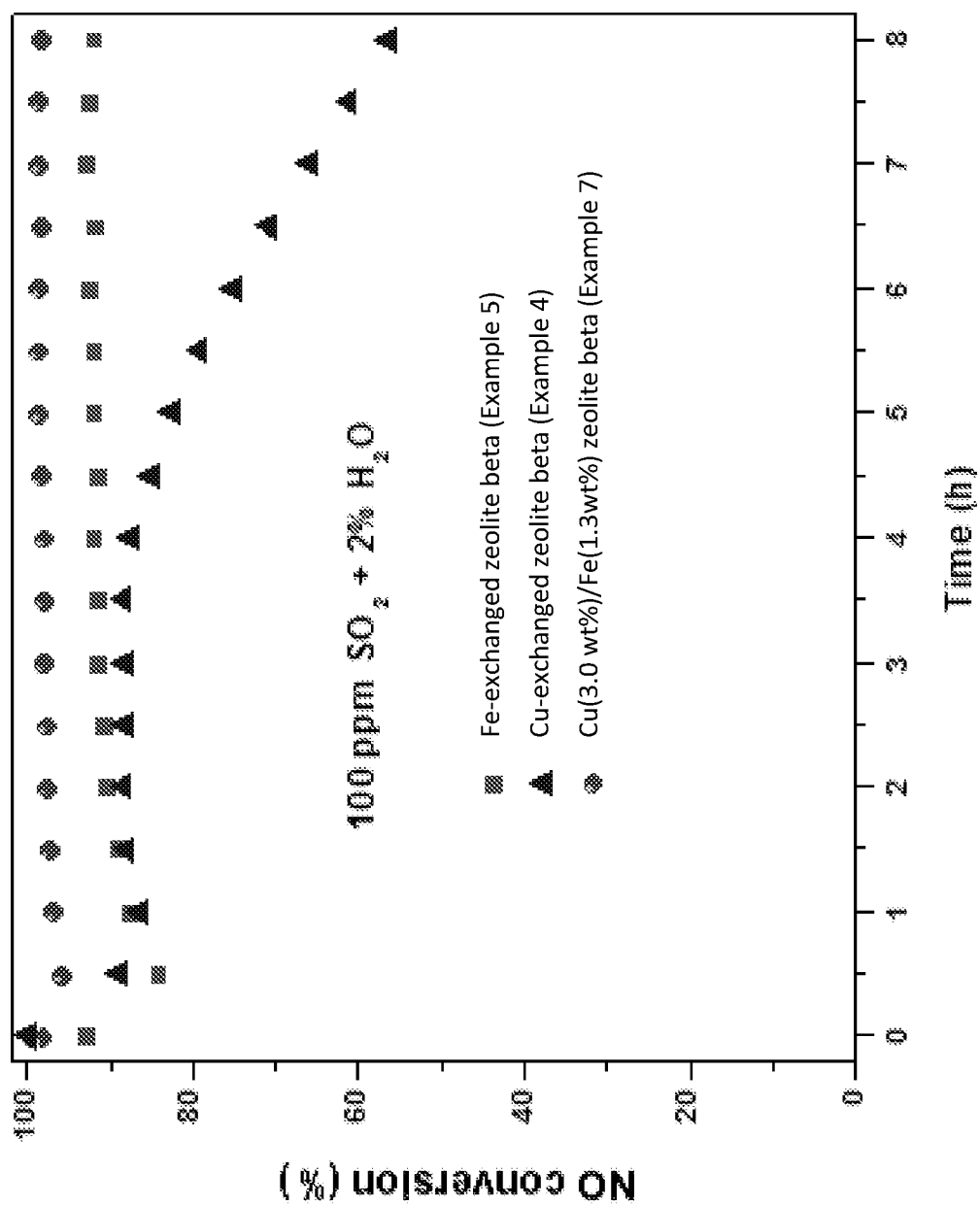
FIG. 3 displays the NO conversion efficiencies of Examples 4, 5 and 7 in a SCR reaction. In the figure, the reaction time is shown along the abscissa and the NO conversion efficiency is plotted along the ordinate.

Examples 4, 5 and 7 were further tested with respect to their sulfur resistance during the catalytic reaction. To this effect, the procedure of Example 13 was repeated, wherein the gas mixture further contains 2% $H_2O$ and 100 ppm of $SO_2$. FIG. 3 shows the time-dependent catalytic reactivities of Examples 4, 5 and 7 in the presence of 2% $H_2O$ and 100 ppm $SO_2$ at 250° C. in a SCR process.

During the measured reaction period, the Cu/Fe-exchanged zeolite beta (Example 7) maintains a high and stable NO conversion efficiency. In contrast, the Fe-exchanged zeolite beta (Example 5) shows a decrease of about 15% in the NO conversion efficiency in the first 0.5 h of the SCR reaction, and the reactivity of Cu-exchanged zeolite beta (Example 4) is observed to decrease continuously after 4 h of reaction. Therefore, the Cu/Fe-exchanged zeolite displays a much better sulfur resistance than the single-metal-exchanged zeolites in the SCR process.

Figure 4:
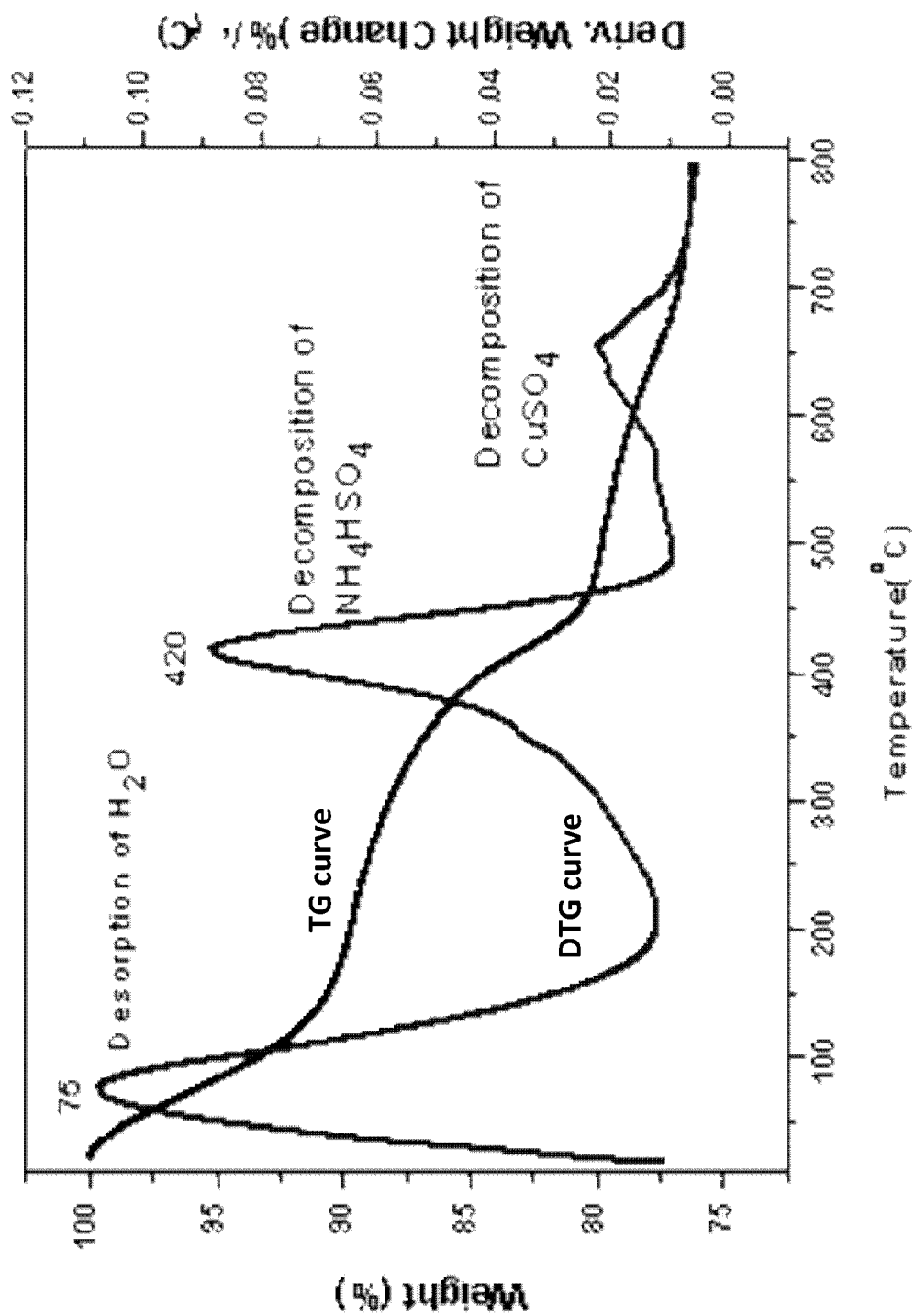
FIG. 4 displays the TG and DTG curves of Example 4. In the figure, the temperature is shown along the abscissa, while the sample mass and the rate of mass loss are respectively plotted along the left and the right ordinates.
Figure 5:
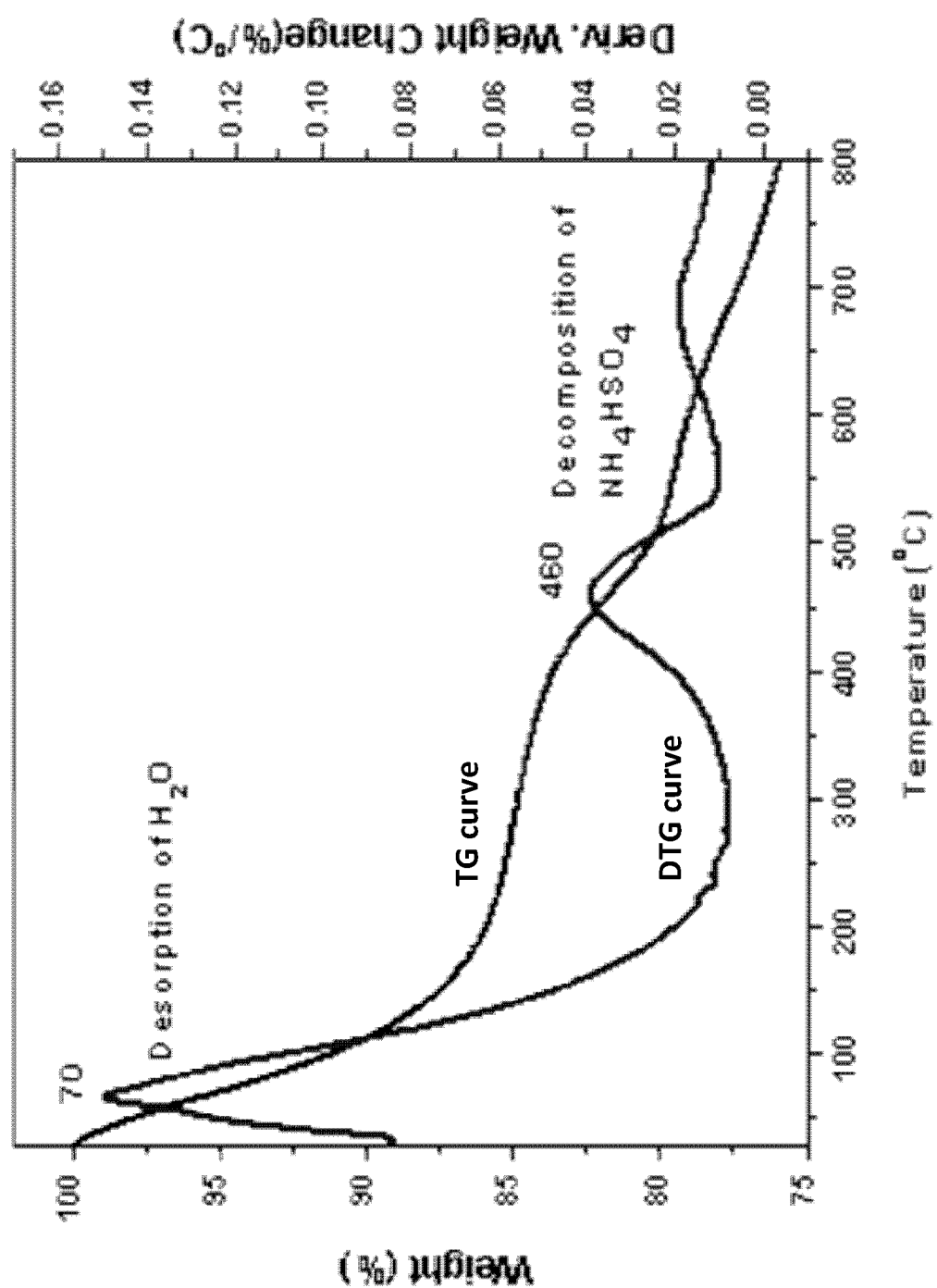
FIG. 5 displays the TG and DTG curves of Example 5. In the figure, the temperature is shown along the abscissa, while the sample mass and the rate of mass loss are respectively plotted along the left and the right ordinates.
Figure 6:
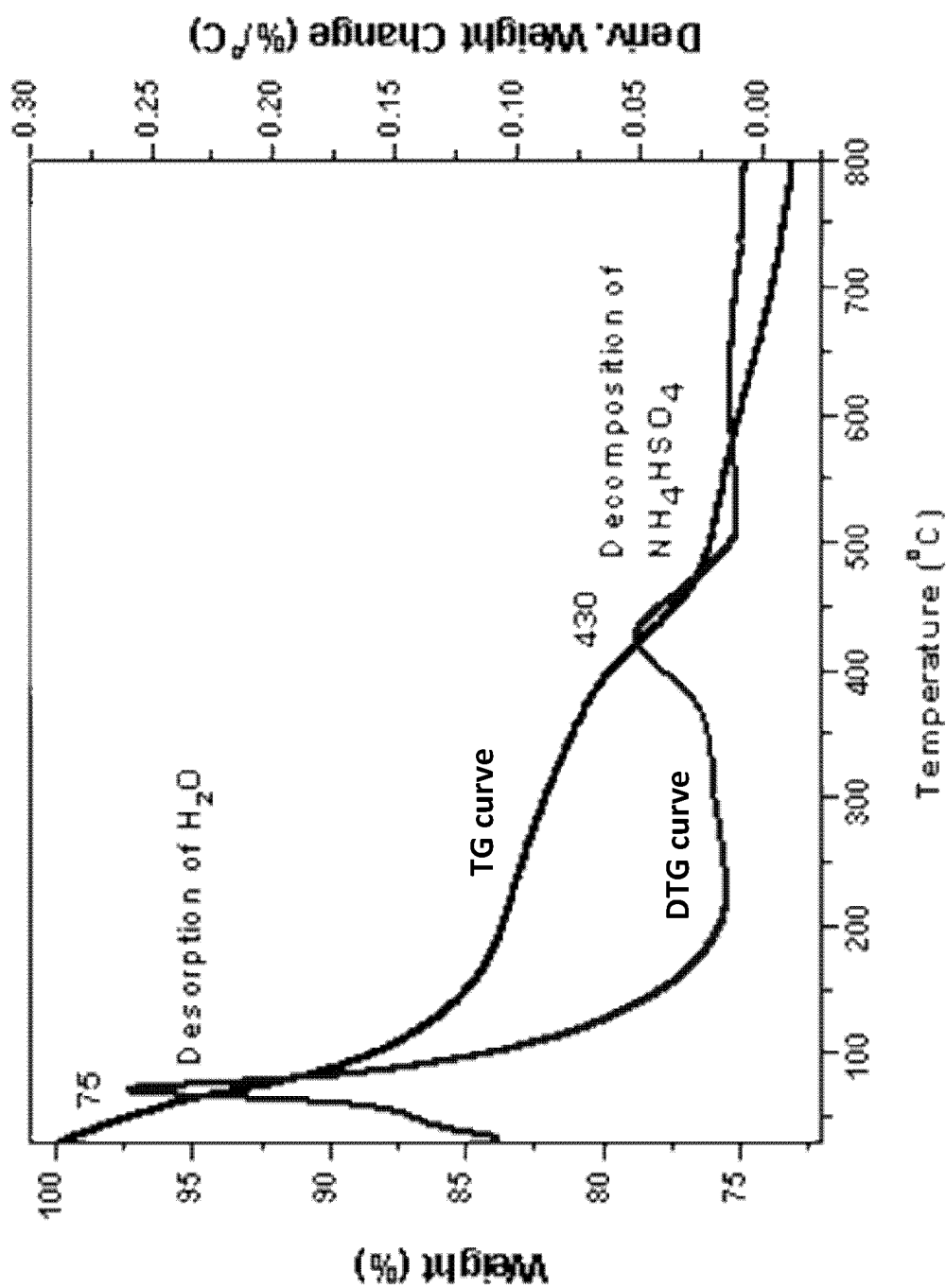
FIG. 6 displays the TG and DTG curves of Example 7. In the figure, the temperature is shown along the abscissa, while the sample mass and the rate of mass loss are respectively plotted along the left and the right ordinates.

The above three zeolitic catalysts reacted after sulfation were then analyzed by TG/DTG measurements, the results of which are shown in FIGS. 4-6. The Cu/Fe-exchanged zeolite beta (Example 7) exhibits a relatively small desorption peak of sulfur species at around 430° C. when compared to the single-metal-exchanged zeolites (Examples 4 and 5). Said results of TG/DTG measurements indicate that the bimetal-exchanged zeolite has a low adsorption of sulfur during the catalytic reaction, which is a further proof of its high sulfur resistance.

Figure 7:
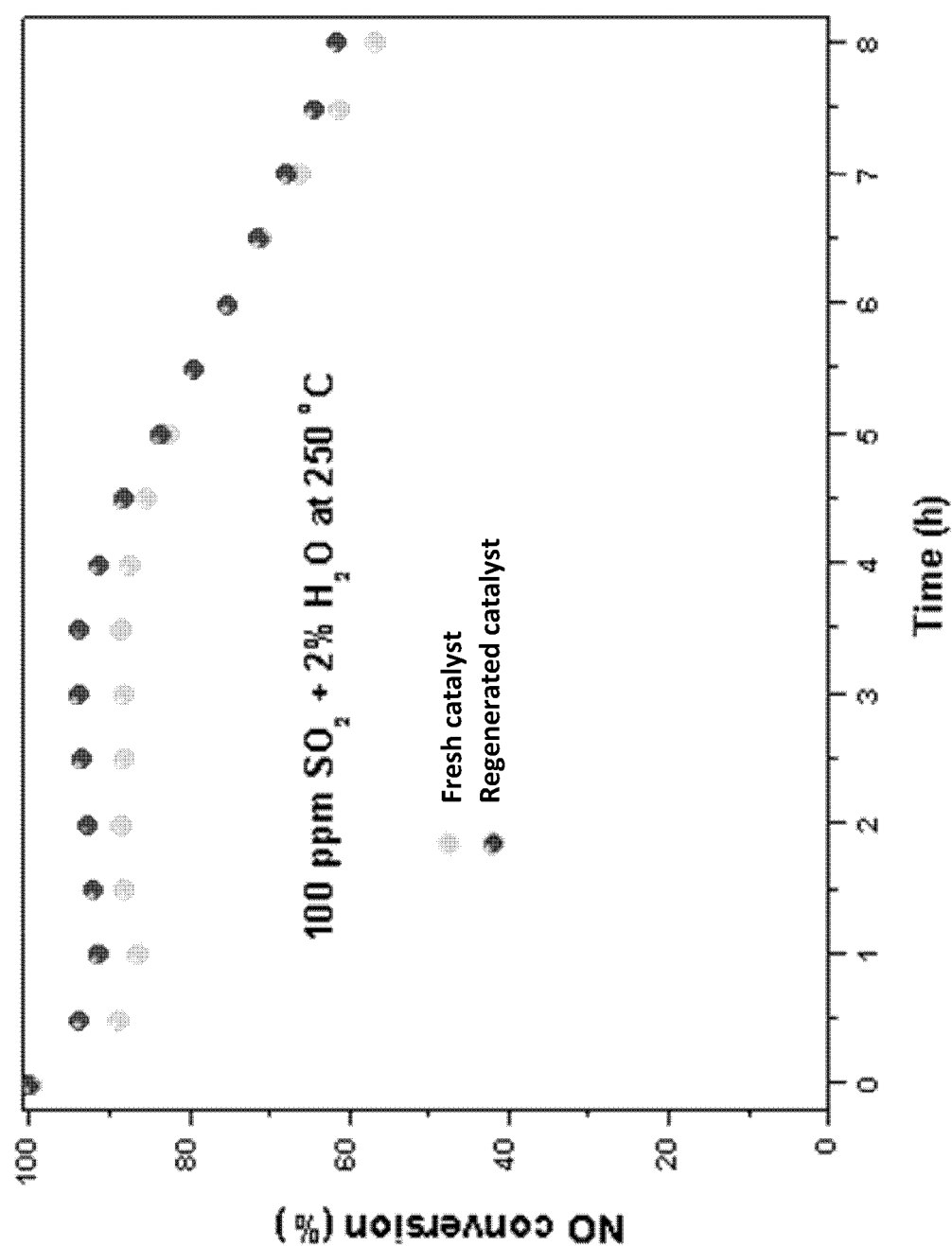
FIG. 7 displays the time-dependent NO conversion efficiencies of a regenerated catalyst and a fresh catalyst of Example 7. In the figure, the reaction time is shown along the abscissa and the NO conversion efficiency is plotted along the ordinate.

Furthermore, it is found that the bimetal-exchanged zeolite after sulfation can be effectively regenerated. More specifically, the regeneration of the sulfated catalysts was performed in a $N_2$ stream (flow rate=40 ml/min) at 450° C. for 1 h to decompose the sulfite/sulfates on the surface. FIG. 7 shows that the regenerated catalyst of Example 7 maintains a high SCR reactivity almost as much as that of the corresponding fresh catalyst.

PRIOR ART DOCUMENTS CITED

U.S. Pat. No. 3,308,069 A
U.S. Pat. No. 4,554,145 A
U.S. Pat. No. 4,642,226 A
U.S. Pat. No. 5,139,759 A
Xiao et al., Chemistry of Materials, 2008, 20, pp. 4533-4535
WO 2010/146156 A1
Majano et al., Chemistry of Materials, 2009, 21, pp. 4184-4191
Metkar et al., Applied catalysis B: Environmental, 2012, 111-112, pp. 67-80
Yang et al., Journal of Physical Chemistry, 2012, 116, pp. 23322-23331
WO 2013/118063 A1

The invention claimed is:

1. A process for the production of a zeolitic material having a BEA-type framework structure comprising $YO_2$ and $X_2O_3$, the process comprising the following operations in the sequence listed:
   (1) preparing a mixture comprising one or more sources for $YO_2$ and one or more sources for $X_2O_3$;
   (2) crystallizing the mixture obtained in step (1), wherein a molar ratio $YO_2: X_2O_3$ of the mixture according to (1) ranges from 5 to 25;
   (3) subjecting a zeolitic material having a BEA-type framework structure obtained in step (2) to an ion-exchange procedure with Cu, and then calcining the Cu ion-exchanged zeolitic material obtained; and
   (4) subjecting the calcined Cu ion-exchanged zeolitic material obtained in step (3) to an ion-exchange procedure with Fe, wherein ferrocene is used for the ion-exchange with Fe in (4), wherein (4) is conducted using a solvent or solvent mixture selected from the group consisting of benzene, chlorobenzene, toluene, pentane, hexane, cyclohexane, heptane and combinations of two or more thereof, and then calcining the Fe ion-exchanged zeolitic material obtained;
   wherein:
   Y is a tetravalent element;
   X is a trivalent element;
   the mixture provided in step (1) and crystallized in step (2) further comprises seed crystals comprising one or more zeolitic materials having a BEA-type framework structure; and
   the mixture provided in step (1) and crystallized in step (2) does not contain an organotemplate as a structure-directing agent, and
   wherein:
   an amount of Cu in the zeolitic material obtained in (4) ranges from greater than 3 to 8 wt.-% calculated as CuO and based on the total weight of the zeolitic material;
   the amount of Fe in the zeolitic material obtained in (4) ranges from 1.0 to 7.5 wt.-% calculated as $Fe_2O_3$ and based on the total weight of the zeolitic material; and
   a molar ratio of Cu:$X_2O_3$ obtained in (4) ranges from 0.1 to 0.7.

2. The process of claim 1, wherein the seed crystals are zeolite beta.

3. The process of claim 1, wherein the zeolitic material obtained in step (2) comprises one or more alkali metals M.

4. The process of claim 1, wherein Y is selected from the group consisting of Si, Sn, Ti, Zr, Ge, and combinations of two or more thereof.

5. The process of claim 1, wherein the one or more sources for $YO_2$ provided in step (1) comprises one or more silicates, or both.

6. The process of claim 1, wherein X is selected from the group consisting of Al, B, In, Ga, and combinations of two or more thereof.

7. The process of claim 1, wherein the one or more sources for $X_2O_3$ comprises one or more aluminate salts.

8. The process of claim 1, wherein the amount of seed crystals comprised in the mixture according to step (1) ranges from 0.1 to 30 wt.-% based on 100 wt.-% of $YO_2$ in the one or more sources for $YO_2$.

9. The process of claim 1, wherein the mixture according to step (1) further comprises one or more solvents.

10. The process of claim 9, wherein the molar ratio $H_2O:YO_2$ of the mixture according to step (1) ranges from 5 to 100.

11. The process of claim 1, wherein the molar ratio M:$YO_2$ in the mixture according to step (1) ranges from 0.05 to 5.

12. The process of claim 1, wherein the molar ratio of $YO_2:X_2O_3:M$ in the mixture according to step (1) ranges from (1 to 200):1:(0.5 to 100).

13. The process of claim 1, wherein the crystallization in step (2) involves heating of the mixture.

14. The process of claim 13, wherein the crystallization in step (2) is conducted under solvothermal conditions.

15. The process of claim 13, wherein the crystallization in step (2) involves heating of the mixture for a period ranging from 5 to 160 h.

16. The process of claim 1, wherein after step (2) and prior to step (3) the process further comprises one or more of the following steps of:
   (i) isolating the zeolitic material having a BEA-type framework structure obtained in step (2); and
   (ii) optionally washing the zeolitic material having a BEA-type framework structure obtained in step (2); and/or
   (iii) optionally drying the zeolitic material having a BEA-type framework structure obtained in step (2);
   wherein the steps (i), (ii), (iii), and combinations thereof, can be conducted in any order.

17. The process of claim 1, wherein the ion-exchange of the zeolitic material having a BEA-type framework structure in step (3) comprises the steps of (3a) exchanging one or more of the ionic non-framework elements contained in the zeolitic material having a BEA-type framework structure obtained in step (2) with $H^+$, $NH_4^+$, or both; and
   (3b) subjecting the zeolitic material having a BEA-type framework structure obtained in step (3a) to an ion-exchange procedure with Cu.

18. The process of claim 1, wherein the calcination of the Cu ion-exchanged zeolitic material is conducted at a temperature ranging from 300 to 850° C.

19. The process of claim 1, wherein the zeolitic material having a BEA-type framework structure formed in step (2) comprises zeolite beta.

20. The process of claim 2, wherein the seed crystals comprise a zeolitic material having the BEA-type framework structure.

21. The process of claim 1, wherein the ion-exchange procedure with Cu in step (3) is performed with one or more copper containing compounds, wherein the one or more copper containing compounds are one or more copper(II) salts.

22. The process of claim 1, wherein the ion-exchange procedure with Fe in step (4) is performed with one or more iron containing compounds, wherein the one or more iron containing compounds are selected from the group consisting of iron(II) salts, iron(III) salts, iron complexes and mixtures thereof.

23. The process of claim 1, wherein the ion-exchange procedure with Fe in step (4) comprises the steps of
 (4a) impregnating the Cu ion-exchanged zeolitic material obtained in step (3) with one or more iron containing compounds, and
 (4b) calcining the zeolitic material obtained in step (4a).

* * * * *

UNITED STATES PATENT AND TRADEMARK OFFICE
CERTIFICATE OF CORRECTION

PATENT NO. : 10,596,518 B2
APPLICATION NO. : 15/109601
DATED : March 24, 2020
INVENTOR(S) : Mathias Feyen et al.

It is certified that error appears in the above-identified patent and that said Letters Patent is hereby corrected as shown below:

On the Title Page

Item (72), Inventors, Line 5, delete "Dalian North Gate Dut" and insert -- Dalian City North Gate Dut --, therefor.

Item (56), Other Publications, Line 1, delete "syntehsizing" and insert -- synthesizing --, therefor.

In the Specification

In Column 4, Line 14, delete "BEA framework" and insert -- BEA-type framework --, therefor.

In Column 5, Line 39, delete "ore" and insert -- or --, therefor.

In Column 7, Line 31, delete "0.6" and insert -- 0.6. --, therefor.

In Column 12, Line 16, delete "insipient" and insert -- incipient --, therefor.

In Column 15, Line 3, delete "iron containing" and insert -- iron-containing --, therefor.

In Column 23, Line 11, delete "wt. %" and insert -- wt.-% --, therefor.

In Column 23, Line 12, delete "wt. %" and insert -- wt.-% --, therefor.

In Column 23, Lines 12-13, delete "wt. %" and insert -- wt.-% --, therefor.

In Column 25, Line 34, delete "nitrogeneous" and insert -- nitrogenous --, therefor.

In Column 25, Line 43, delete "nitrogeneous" and insert -- nitrogenous --, therefor.

In Column 31, Line 22, delete "nitrogeneous" and insert -- nitrogenous --, therefor.

Signed and Sealed this
Twenty-second Day of September, 2020

Andrei Iancu
*Director of the United States Patent and Trademark Office*

In Column 32, Line 20, delete "waterglass" and insert -- water glass --, therefor.

In the Claims

In Column 38, Claim 5, Line 16, delete "silicates, or both." and insert -- silicates, silicas, or both. --, therefor.